United States Patent
Wang et al.

(10) Patent No.: US 10,371,958 B2
(45) Date of Patent: Aug. 6, 2019

(54) DISPLAY DEVICE

(71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN); Jifeng Tan, Beijing (CN); Can Wang, Beijing (CN); Xinli Ma, Beijing (CN); Jian Gao, Beijing (CN); Can Zhang, Beijing (CN); Qian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/752,729

(22) PCT Filed: Jun. 6, 2017

(86) PCT No.: PCT/CN2017/087264
§ 371 (c)(1),
(2) Date: Feb. 14, 2018

(87) PCT Pub. No.: WO2017/219854
PCT Pub. Date: Dec. 28, 2017

(65) Prior Publication Data
US 2018/0239158 A1 Aug. 23, 2018

(30) Foreign Application Priority Data
Jun. 24, 2016 (CN) .......................... 2016 1 0476253

(51) Int. Cl.
*G02B 27/22* (2018.01)
*G02B 5/18* (2006.01)
(Continued)

(52) U.S. Cl.
CPC .......... *G02B 27/2214* (2013.01); *G02B 5/18* (2013.01); *G02B 5/1819* (2013.01);
(Continued)

(58) Field of Classification Search
CPC ...... G02B 27/2214; G02B 5/18; G02B 27/22; G02B 27/225; G02B 5/1819; G02B 5/1866; G02F 1/29; G02F 1/133504; G02F 1/1335; H04N 13/344; H04N 13/31
USPC .......................................................... 359/462
See application file for complete search history.

(56) References Cited

U.S. PATENT DOCUMENTS

| 5,493,427 A | 2/1996 | Nomura et al. |
| 5,943,166 A | 8/1999 | Hoshi et al. |
(Continued)

FOREIGN PATENT DOCUMENTS

| CN | 103499898 | 1/2014 |
| CN | 104460018 | 3/2015 |
(Continued)

OTHER PUBLICATIONS

"First office action," CN Application No. 201610476253.5 (dated Nov. 8, 2017).
(Continued)

*Primary Examiner* — Stephone B Allen
*Assistant Examiner* — Rahman Abdur
(74) *Attorney, Agent, or Firm* — Womble Bond Dickinson (US) LLP

(57) ABSTRACT

A display device comprises a display panel and a grating layer. From a center of a left-eye field-of-view central area of a left display area to a non left-eye field-of-view central area of the left display area, a grating period of a left-eye grating region of a first color, a grating period of a left-eye grating region of a second color, and a grating period of a left-eye grating region of a third color all decrease gradually. From a center of a right-eye field-of-view central area of a right display area to a non right-eye field-of-view central area of the right display area, a grating period of a right-eye grating region of the first color, a grating period of a right-eye grating region of the second color, and a grating period of a right-eye grating region of the third color all decrease gradually.

20 Claims, 8 Drawing Sheets

(51) Int. Cl.
H04N 13/31       (2018.01)
G02F 1/1335      (2006.01)
G02F 1/29        (2006.01)
H04N 13/344      (2018.01)

(52) U.S. Cl.
CPC ........... *G02B 5/1866* (2013.01); *G02B 27/22* (2013.01); *G02B 27/225* (2013.01); *G02F 1/133504* (2013.01); *G02F 1/29* (2013.01); *H04N 13/31* (2018.05); *H04N 13/344* (2018.05); *G02F 1/1335* (2013.01)

(56)  References Cited

U.S. PATENT DOCUMENTS

| | | |
|---|---|---|
| 2010/0156773 A1 | 6/2010 | Uehara et al. |
| 2013/0100365 A1 | 4/2013 | Komura et al. |
| 2016/0033778 A1 | 2/2016 | Lin et al. |

FOREIGN PATENT DOCUMENTS

| | | |
|---|---|---|
| CN | 105093546    | 11/2015 |
| CN | 105487239    | 4/2016  |
| CN | 105892079    | 8/2016  |
| CN | 105911710    | 8/2016  |
| CN | 205720988    | 11/2016 |
| CN | 205720989 U  | 11/2016 |
| JP | 2013092607   | 5/2013  |
| JP | 2016048344   | 4/2016  |

OTHER PUBLICATIONS

"International search report," PCT/CN2017/087264 (dated Sep. 1, 2017).

DISPLAY DEVICE

RELATED APPLICATION

This application is the U.S. national phase entry of PCT/CN2017/087264, with an international filing date of Jun. 6, 2017, which claims priority to the Chinese patent application No. 201610476253.5 filed on Jun. 24, 2016, the entirety of which is incorporated herein by reference.

FIELD

The present disclosure relates to the field of display technologies, in particular to a display device.

BACKGROUND

A display device is a device for displaying characters, numbers, symbols, pictures or images formed by at least two selected from a group comprising characters, numbers, symbols and pictures. The display device can be a flat surface display device, a curved-surface display device, a 3D display device, a near eye display device, or an enhanced reality (AR)/virtual reality (VR) display device, etc.

With the development of display devices, more and more sophisticated demands are brought out by people with the on-the-spot effect of display and the immersion of viewer. In order to improve the on-the-spot effect of display and the immersion of viewer, one of the key technologies is to effectively control light propagation within the display device. For example, with respect to a display device for near eye display, the display device comprises a display panel that includes a left display area corresponding to a left eye of a viewer and a right display area corresponding to a right eye of the viewer. The left display area includes a left-eye field-of-view central area and a non left-eye field-of-view central area, while the right display area includes a right-eye field-of-view central area and a non right-eye field-of-view central area. When the viewer is viewing an image displayed by the display device, a left-eye sight of the viewer concentrates on the left-eye field-of-view central area, and a right-eye sight of the viewer concentrates on the right-eye field-of-view central area. By controlling light propagation within the display device, the image viewed by the viewer seems to be projected on a virtual screen in front of or behind the display device, light emitted from points on the left display area corresponding to each point on the virtual screen is directed to the left eye of the viewer, and light emitted from points on the right display area corresponding to each point on the virtual screen is directed to the right eye of the viewer, thus realizing virtual display or 3D display of the display device, which makes the display device to have a good on-the-spot effect and improves the immersion of the viewer.

At present, microprisms or microlenses are usually provided in the display device to control light propagation within the display device, namely, the existing display device usually uses structures designed on the basis of geometrical optics principles to realize control to light propagation within the display device. However, with the development of near eye display devices, structures designed on the basis of geometrical optics principles can no longer meet the requirements on the control to light propagation within the display device, so the on-the-spot effect of the display device and the immersion of the viewer get worse, and bad viewing experience is brought to the viewer.

SUMMARY

An object of the present disclosure is to provide an improved display device.

In order to achieve the above object, one aspect of the present disclosure provides a display device, comprising: a display panel, and a grating layer arranged inside or outside of the display panel. The display panel comprises a left display area corresponding to a left eye of a viewer and a right display area corresponding to a right eye of the viewer; the left display area comprises a plurality of left-eye pixels of a first color, a plurality of left-eye pixels of a second color, a plurality of left-eye pixels of a third color, and the right display area comprises a plurality of right-eye pixels of the first color, a plurality of right-eye pixels of the second color, and a plurality of right-eye pixels of the third color.

The grating layer comprises a left grating region corresponding to the left display area, and a right grating region corresponding to the right display area. The left grating region comprises a left-eye grating region of the first color corresponding to the left-eye pixels of the first color, a left-eye grating region of the second color corresponding to the left-eye pixels of the second color, and a left-eye grating region of the third color corresponding to the left-eye pixels of the third color. The right grating region comprises a right-eye grating region of the first color corresponding to the right-eye pixels of the first color, a right-eye grating region of the second color corresponding to the right-eye pixels of the second color, and a right-eye grating region of the third color corresponding to the right-eye pixels of the third color.

Along a direction from a center of a left-eye field-of-view central area of the left display area to a non left-eye field-of-view central area of the left display area, a grating period of the left-eye grating region of the first color, a grating period of the left-eye grating region of the second color, and a grating period of the left-eye grating region of the third color all decrease gradually, and light emitted by the display device from a position corresponding to the left-eye pixels of the first color, light emitted by the display device from a position corresponding to the left-eye pixels of the second color, and light emitted by the display device from a position corresponding to the left-eye pixels of the third color are all directed to the left eye of the viewer.

Along a direction from a center of a right-eye field-of-view central area of the right display area to a non right-eye field-of-view central area of the right display area, a grating period of the right-eye grating region of the first color, a grating period of the right-eye grating region of the second color, and a grating period of the right-eye grating region of the third color all decrease gradually, and light emitted by the display device from a position corresponding to the right-eye pixels of the first color, light emitted by the display device from a position corresponding to the right-eye pixels of the second color, and light emitted by the display device from a position corresponding to the right-eye pixels of the third color are all directed to the right eye of the viewer.

Another aspect of the present disclosure provides another display device, which comprises a left display panel, a right display panel, a left grating layer arranged inside or outside of the left display panel, and a right grating layer arranged inside or outside of the right display panel.

The left display panel corresponds to a left eye of a viewer, and the right display panel corresponds to a right eye of the viewer. The left display panel comprises a plurality of left-eye pixels of a first color, a plurality of left-eye pixels of a second color, a plurality of left-eye pixels of a third color, and the right display panel comprises a plurality of right-eye pixels of the first color, a plurality of right-eye pixels of the second color, and a plurality of right-eye pixels of the third color.

The left grating layer comprises a left-eye grating region of the first color corresponding to the left-eye pixels of the first color, a left-eye grating region of the second color corresponding to the left-eye pixels of the second color, and a left-eye grating region of the third color corresponding to the left-eye pixels of the third color. The right grating layer comprises: a right-eye grating region of the first color corresponding to the right-eye pixels of the first color, a right-eye grating region of the second color corresponding to the right-eye pixels of the second color, and a right-eye grating region of the third color corresponding to the right-eye pixels of the third color.

Along a direction from a center of a left-eye field-of-view central area of the left display panel to a non left-eye field-of-view central area of the left display panel, a grating period of the left-eye grating region of the first color, a grating period of the left-eye grating region of the second color, and a grating period of the left-eye grating region of the third color all decrease gradually, and light emitted by the display device from a position corresponding to the left-eye pixels of the first color, light emitted by the display device from a position corresponding to the left-eye pixels of the second color, and light emitted by the display device from a position corresponding to the left-eye pixels of the third color are all directed to the left eye of the viewer.

Along a direction from a center of a right-eye field-of-view central area of the right display panel to a non right-eye field-of-view central area of the right display panel, a grating period of the right-eye grating region of the first color, a grating period of the right-eye grating region of the second color, and a grating period of the right-eye grating region of the third color all decrease gradually, and light emitted by the display device from a position corresponding to the right-eye pixels of the first color, light emitted by the display device from a position corresponding to the right-eye pixels of the second color, and light emitted by the display device from a position corresponding to the right-eye pixels of the third color are all directed to the right eye of the viewer.

A grating layer is arranged in the display device provided in the present disclosure. By setting the grating periods at different positions of the grating layer, the diffraction effect of light during propagation in the display device can be controlled, thereby controlling light propagation within the display device and realizing control to light emitted by the display device. In other words, in the present disclosure, a structure designed on the basis of physical optics principles is used to control light propagation within the display device. Compared to the structure designed on the basis of the geometrical optics principles for controlling propagation of light within the display device in the prior art, the structure designed on the basis of the physical optics principles has higher ability in controlling propagation of light within the display device, so it can better control propagation of light within the display device, improve the effect of controlling of light propagation within the display device, and improve the on-the-spot effect of display of the display device and the immersion of the viewer. As a result, the viewer can enjoy more real and comfortable viewing experience.

BRIEF DESCRIPTION OF DRAWINGS

The figures described herein provide further understanding of the present disclosure and form a part of the present disclosure. Exemplary embodiments of the present disclosure and descriptions thereof are used for explaining the present disclosure, but they do not intend to inappropriately define the present disclosure. In the figures.

DETAILED DESCRIPTION

In order to further describe the display device provided in the embodiment of the present disclosure, detailed descriptions are given below with reference to the figures of the description.

In the figures, the following reference signs are used:
10—display device
20—display panel
21—left display area
22—right display area
23—color film layer
30—left display panel
40—right display panel
50—light barrier
60—grating layer
61—left grating region
62—right grating region
63—left grating bulge
64—right grating bulge
65—gap
70—virtual screen.

Figure 1:
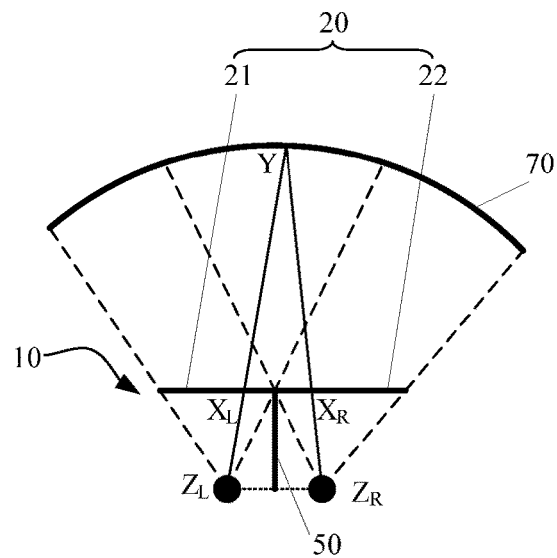
FIG. 1 is a structural diagram of a display device provided in an embodiment of the present disclosure.
Figure 2:
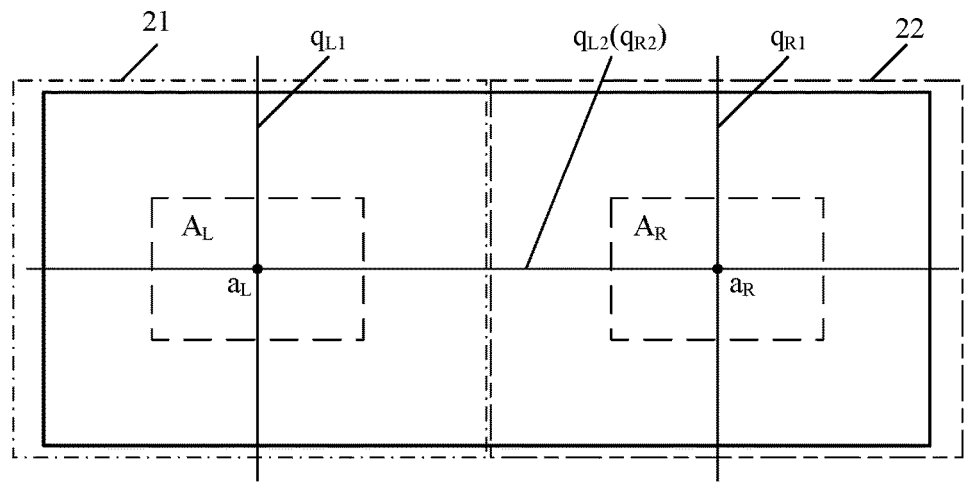
FIG. 2 is a plane view of the display device of FIG. 1.
Figure 3:
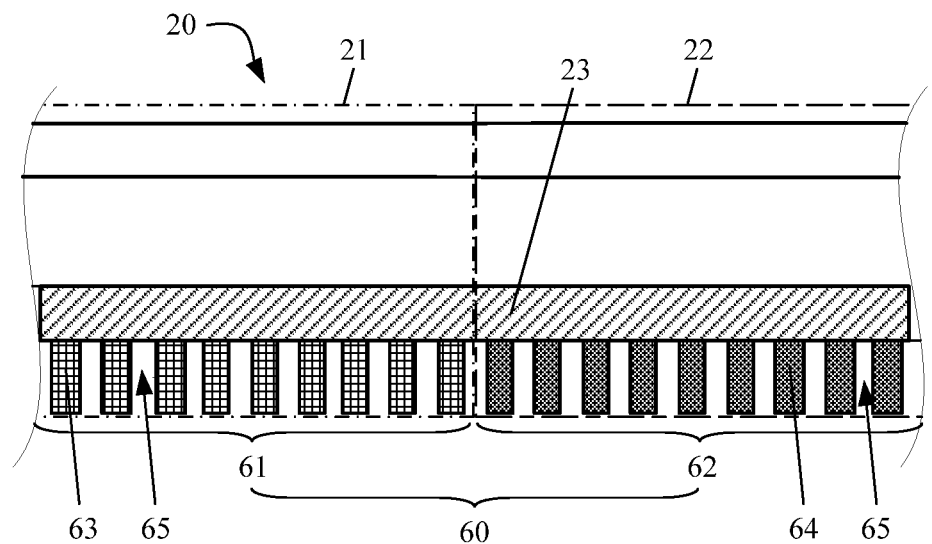
FIG. 3 is a sectional view of the display device of FIG. 1.

Referring to FIGS. 1-3, a display device provided in an embodiment of the present disclosure is configured for virtual display. The display device 10 comprises a display panel 20 and a grating layer 60 that is arranged inside or outside of the display panel 20. The display panel 20 comprises a left display area 21 corresponding to a left eye $Z_L$ of a viewer and a right display area 22 corresponding to a right eye $Z_R$ of the viewer. The left display area 21 comprises a plurality of left-eye R pixels, a plurality of left-eye G pixels and a plurality of left-eye B pixels, and the right display area 22 comprises a plurality of right-eye R pixels, a plurality of right-eye G pixels and a plurality of right-eye B pixels. The grating layer 60 comprises a left grating region 61 corresponding to the left display area 21 and a right grating region 62 corresponding to the right display area 22. The left grating region 61 comprises a left-eye R grating region corresponding to the left-eye R pixels, a left-eye G grating region corresponding to the left-eye G pixels and a left-eye B grating region corresponding to the left-eye B pixels. The right grating region 62 comprises a right-eye R grating region corresponding to the right-eye R pixels, a right-eye G grating region corresponding to the right-eye G pixels and a right-eye B grating region corresponding to the right-eye B pixels.

Along a direction pointing from a center $a_L$ of a left-eye field-of-view central area $A_L$ of the left display area 21 to a non left-eye field-of-view central area of the left display area 21, a grating period of the left-eye R grating region, a grating period of the left-eye G grating region, and a grating period of the left-eye B grating region all decrease gradually, and light emitted by the display device 10 from a position corresponding to the left-eye R pixels, light emitted by the display device 10 from a position corresponding to the left-eye G pixels, and light emitted by the display device 10 from a position corresponding to the left-eye B pixels are all directed to the left eye $Z_L$ of the viewer.

Along a direction pointing from a center $a_R$ of a right-eye field-of-view central area $A_R$ of the right display area 22 to a non right-eye field-of-view central area of the right display area 22, a grating period of the right-eye R grating region, a grating period of the right-eye G grating region, and a grating period of the right-eye B grating region all decrease gradually, and light emitted by the display device 10 from a position corresponding to the right-eye R pixels, light emitted by the display device 10 from a position corresponding to the right-eye G pixels, and light emitted by the display device 10 from a position corresponding to the right-eye B pixels are all directed to the right eye $Z_R$ of the viewer.

It shall be noted that in the above embodiment, the display device 10 can be a flat surface display device or a curved surface display device. In the embodiment of the present disclosure, detailed descriptions are given for the example that the display device 10 is a flat surface display device.

For example, referring to FIGS. 1-3, the display device 10 provided in the embodiment of the present disclosure comprises the display panel 20 that comprises the left display area 21 corresponding to the left eye $Z_L$ of the viewer and the right display area 22 corresponding to the right eye $Z_R$ of the viewer. The left display area 21 and the right display area 22 each occupy half of the display panel 20. The left-eye field-of-view central area $A_L$ and the non left-eye field-of-view central area are in the left display area 21, and the right-eye field-of-view central area $A_R$ and the non right-eye field-of-view central area are in the right display area 22. When the viewer is viewing an image displayed by the display device 10, sight of the left eye $Z_L$ the viewer concentrates on the left-eye field-of-view central area $A_L$, and sight of the right eye $Z_R$ of the viewer concentrates on the right-eye field-of-view central area $A_R$.

When the viewer is viewing an image displayed by the display device 10, the image viewed by the viewer seems to be projected on a virtual screen 70 behind or in front of the display device 10, wherein the viewer, the display device 10 and the virtual screen 70 form an optical system, in which the virtual screen 70 can be at a focal plane of the optical system. For example, the virtual screen 70 may be at a back focal plane of the optical system, i.e. the virtual screen 70 is at a focal plane behind the display device 10. Alternatively, the virtual screen 70 may be at a front focal plane of the optical system, i.e. the virtual screen 70 is at a focal plane in front of the display device 10. Suppose that there is a point Y on the virtual screen 70, and an image at point Y as seen by the left eye $Z_L$ of the viewer is an image displayed at a point $X_L$ on the display device 10, wherein the left eye $Z_L$ of the viewer, point Y on the virtual screen 70 and point $X_L$ on the display device 10 are on the same straight line; an image at point Y as seen by the right eye $Z_R$ of the viewer is an image displayed at a point $X_R$ on the display device 10, wherein the right eye $Z_R$ of the viewer, point Y on the virtual screen 70 and point $X_R$ on the display device 10 are on the same straight line. In this case, a distance of $X_LY$ is a defocusing amount corresponding to the left eye $Z_L$ of the viewer in the optical system, and a distance of $X_RY$ is a defocusing amount corresponding to the right eye $Z_R$ of the viewer in the optical system. Images displayed at respective positions on the display device 10 can be obtained by calculating from corresponding defocusing amounts, or images displayed at respective positions on the display device 10 can be obtained by recording and storing by a special device.

In practical applications, when the viewer is in an viewing area in front of the display device 10 and is viewing an image displayed by the display device 10, the image viewed by the viewer may further include a depth of field image. The depth of field image can be image recorded and processed by a special device, or it can be obtained by calculating according to an image processing algorithm by a display chip or a Central Processing Unit (CPU) in the display device 10. Thus the image displayed by the display device 10 may: include only image that can be projected on a certain virtual screen 70 in front of the display device 10; include only image that can be projected on a certain virtual screen 70 behind the display device 10; include image that can be projected on a certain virtual screen 70 in front of the display device 10 as well as a depth of field image of the virtual screen 70; include image that can be projected on a certain virtual screen 70 behind the display device 10 as well as a depth of field image of the virtual screen 70; include image that can be projected on a certain virtual screen 70 in front of the display device 10 as well as a depth of field image of the display device 10; include image that can be projected on a certain virtual screen 70 behind the display device 10 as well as a depth of field image of the display device 10; or include images that can be projected on all virtual screens 70 viewable by the viewer as well as depth of field images of respective virtual screens 70.

The display device 10 further includes the grating layer 60 arranged inside or outside of the display panel 20. The grating layer 60 comprises the left grating region 61 corresponding to the left display area 21 and the right grating region 62 corresponding to the right display area 22. The display panel 20 can be a liquid crystal display panel, an OLED (Organic Light-Emitting Diode) display panel, a PDP (Plasma Display Panel) display panel, a CRT (Cathode Ray Tube) display panel, etc. The grating layer 60 can be arranged inside or outside of the display panel 20. For example, when the display device 10 is a liquid crystal display device, it comprises a back light source and the display panel 20 at a light emergent side of the back light source. The display panel 20 comprises a first substrate and a second substrate arranged opposite to each other. The grating layer 60 can be arranged between the first substrate and the second substrate, or the grating layer 60 can be arranged on a side of the first substrate facing away from the second substrate, or, the grating layer 60 can be arranged on a side of the second substrate facing away from the first substrate, or the grating layer 60 can be arranged on the light emergent side of the back light source.

A color scheme of the display device 10 is the RGB (Red, Green, Blue) color scheme. The left display area 21 of the display panel 20 comprises a plurality of left-eye R pixels, a plurality of left-eye G pixels, a plurality of left-eye B pixels, and the right display area 22 of the display panel 20 comprises a plurality of right-eye R pixels, a plurality of right-eye G pixels, and a plurality of right-eye B pixels. The left grating region 61 of the grating layer 60 comprises the left-eye R grating region corresponding to the left-eye R pixels, the left-eye G grating region corresponding to the left-eye G pixels and the left-eye B grating region corresponding to the left-eye B pixels, and the right grating region 62 of the grating layer 60 comprises the right-eye R grating region corresponding to the right-eye R pixels, the right-eye G grating region corresponding to the right-eye G pixels and the right-eye B grating region corresponding to the right-eye B pixels.

Along the direction pointing from the center $a_L$ of the left-eye field-of-view central area $A_L$ to the non left-eye field-of-view central area, the grating period of the left-eye R grating region, the grating period of the left-eye G grating region, and the grating period of the left-eye B grating region all decrease gradually, namely, it can be considered that the center of the left-eye field-of-view central area $A_L$ in FIG. 2 is point $a_L$, and from the point $a_L$ to an edge of the left display area 21 in FIG. 2, the grating period of the left-eye R grating region, the grating period of the left-eye G grating region, and the grating period of the left-eye B grating region all decrease gradually. For example, from the point $a_L$ in FIG. 2 to an upper edge of the left display area 21 in FIG. 2, the grating period of the left-eye R grating region, the grating period of the left-eye G grating region, and the grating period of the left-eye B grating region all decrease gradually; from the point $a_L$ in FIG. 2 to a lower edge of the left display area 21 in FIG. 2, the grating period of the left-eye R grating region, the grating period of the left-eye G grating region, and the grating period of the left-eye B grating region all decrease gradually; from the point $a_L$ in FIG. 2 to a left edge of the left display area 21 in FIG. 2, the grating period of the left-eye R grating region, the grating period of the left-eye G grating region, and the grating period of the left-eye B grating region all decrease gradually; and from the point $a_L$ in FIG. 2 to a right edge of the left display area 21 in FIG. 2, the grating period of the left-eye R grating region, the grating period of the left-eye G grating region, and the grating period of the left-eye B grating region all decrease gradually.

Light emitted by the display device 10 from a position corresponding to the left-eye R pixels, light emitted by the display device 10 from a position corresponding to the left-eye G pixels, and light emitted by the display device 10 from a position corresponding to the left-eye B pixels are all directed to the left eye $Z_L$ of the viewer. For example, as shown in FIG. 1, there is a point Y on the virtual screen 70, and an image at point Y as seen by the left eye $Z_L$ of the viewer is an image displayed at a point $X_L$ on the display device 10, wherein the left eye $Z_L$ of the viewer, point Y on the virtual screen 70 and point $X_L$ on the display device 10 are on the same straight line. Light emitted from the point $X_L$ on the display device 10 is directed to the left eye $Z_L$ of the viewer, i.e. light emitted from the point $X_L$ on the display device 10 is emitted along the straight line in which the left eye $Z_L$ of the viewer, the point Y on the virtual screen 70 and the point $X_L$ on the display device 10 are located. When the point $X_L$ on the display device 10 corresponds to the left-eye R pixels, it emits red light, and the red light is emitted along the straight line in which the left eye $Z_L$ of the viewer, the point Y on the virtual screen 70 and the point $X_L$ on the display device 10 are located; when the point $X_L$ on the display device 10 corresponds to the left-eye G pixels, it emits green light, and the green light is emitted along the straight line in which the left eye $Z_L$ of the viewer, the point Y on the virtual screen 70 and the point $X_L$ on the display device 10 are located; when the point $X_L$ on the display device 10 corresponds to the left-eye B pixels, it emits blue light, and the blue light is emitted along the straight line in which the left eye $Z_L$ of the viewer, the point Y on the virtual screen 70 and the point $X_L$ on the display device 10 are located.

Along a direction pointing from a center $a_R$ of the right-eye field-of-view central area $A_R$ to the non right-eye field-of-view central area, a grating period of the right-eye R grating region, a grating period of the right-eye G grating region, and a grating period of the right-eye B grating region all decrease gradually, namely, it can be considered that the center of the right-eye field-of-view central area $A_R$ in FIG. 2 is the point $a_R$ and from point $a_R$ in FIG. 2 to an edge of the right display area 22 in FIG. 2, the grating period of the right-eye R grating region, the grating period of the right-eye G grating region, and the grating period of the right-eye B grating region all decrease gradually. For example, from the point $a_R$ in FIG. 2 to an upper edge of the right display area 22 in FIG. 2, the grating period of the right-eye R grating region, the grating period of the right-eye G grating region, and the grating period of the right-eye B grating region all decrease gradually; from the point $a_R$ in FIG. 2 to a lower edge of the right display area 22 in FIG. 2, the grating period of the right-eye R grating region, the grating period of the right-eye G grating region, and the grating period of the right-eye B grating region all decrease gradually; from the point $a_R$ in FIG. 2 to a left edge of the right display area 22 in FIG. 2, the grating period of the right-eye R grating region, the grating period of the right-eye G grating region, and the grating period of the right-eye B grating region all decrease gradually; and from the point $a_R$ in FIG. 2 to a right edge of the right display area 22 in FIG. 2, the grating period of the right-eye R grating region, the grating period of the right-eye G grating region, and the grating period of the right-eye B grating region all decrease gradually.

Light emitted by the display device 10 from a position corresponding to the right-eye R pixels, light emitted by the display device 10 from a position corresponding to the right-eye G pixels, and light emitted by the display device 10 from a position corresponding to the right-eye B pixels are all directed to the right eye $Z_R$ of the viewer. For example, as shown in FIG. 1, there is a point Y on the virtual screen 70, and an image at point Y as seen by the right eye $Z_R$ of the viewer is an image displayed at a point $X_R$ on the display device 10, and the right eye $Z_R$ of the viewer, point Y on the virtual screen 70 and point $X_R$ on the display device 10 are on the same straight line. Light emitted from the point $X_R$ on the display device 10 is directed to the right eye $Z_R$ of the viewer, i.e. light emitted from the point $X_R$ on the display device 10 is emitted along the straight line in which the right eye $Z_R$ of the viewer, the point Y on the virtual screen 70 and the point $X_R$ on the display device 10 are located. When the point $X_R$ on the display device 10 corresponds to the right-eye R pixels, it emits red light, and the red light is emitted along the straight line in which the right eye $Z_R$ of the viewer, the point Y on the virtual screen 70 and the point $X_R$ on the display device 10 are located; when the point $X_R$ on the display device 10 corresponds to the right-eye G pixels, it emits green light, and the green light is emitted along the straight line in which the right eye $Z_R$ of the viewer, the point Y on the virtual screen 70 and the point $X_R$ on the display device 10 are located; when the point $X_R$ on the display device 10 corresponds to the right-eye B pixels, it emits blue light, and the blue light is emitted along the straight line in which the right eye $Z_R$ of the viewer, the point Y on the virtual screen 70 and the point $X_R$ on the display device 10 are located.

A grating layer 60 is arranged in the display device 10 provided in the embodiment of the present disclosure, and incident light incident on the grating layer 60 is diffracted at the grating layer 60 to obtain a kth-order diffraction (k=0, ±1, ±2K). A relationship between a diffraction angle θ of the kth-order diffraction and a grating period P of the grating layer 60 usually satisfies the formula of:

$$\sin\theta = \sin\theta_0 + \frac{k\lambda}{P}, k = 0, \pm 1, \pm 2K \quad (1)$$

In formula (1), $\theta_0$ is an incident angle of the incident light incident on the grating layer 60, λ is a wavelength of the incident light incident on the grating layer 60.

According to formula (1), when the incident angle $\theta_0$ of the incident light incident on the grating layer 60 is fixed, with respect to a zero-order diffraction, the diffraction angle θ of the zero-order diffraction equals to the incident angle $\theta_0$ of the incident light incident on the grating layer 60, so the grating period P of the grating layer does not have any impact on the diffraction angle of the zero-order diffraction; with respect to a non-zero-order diffraction, such as first-order diffraction, second-order diffraction, third-order diffraction, etc., as the grating period P decreases, the diffraction angle θ of the non-zero-order diffraction increase gradually. Thus by setting different grating periods P, the diffraction angle θ of the non-zero-order diffraction can be adjusted, so that light of the non-zero-order diffraction is emitted towards a preset direction.

For example, referring to FIG. 1, when the viewer is viewing an image displayed by the display device 10, the image viewed by the viewer seems to be projected on a virtual screen 70 behind the display device 10. The image at point Y on the virtual screen 70 as seen by the left eye $Z_L$ of the viewer corresponds to the image at point $X_L$ on the display device 10. In order to make the image at point Y on the virtual screen 70 be seen by the left eye $Z_L$ of the viewer, a light emergent direction at point $X_L$ on the display device 10 needs to be adjusted, so that light at point $X_L$ on the display device 10 is emitted along the straight line in which $Z_L$, $X_L$ and Y are located. The grating period P of the grating layer 60 at a position corresponding to the point $X_L$ can be set, and a diffraction angle θ of a non-zero-order diffraction obtained by the incident light being diffracted at the position of the grating layer 60 corresponding to the point $X_L$ can be adjusted, such that light of the non-zero-order diffraction is emitted along the straight line in which $Z_L$, $X_L$ and Y are located, and that the image at point Y on the virtual screen 70 is seen by the left eye $Z_L$ of the viewer.

If the point $X_L$ on the display device 10 corresponds to a left-eye R pixel, then the grating period P of the grating layer 60 corresponding to the left-eye R pixel is set, so that the non-zero-order diffraction obtained by the incident light being diffracted at a position of the grating layer 60 corresponding to the left-eye R pixel is diffracted along the straight line in which $Z_L$, $X_L$ and Y are located. If the point $X_L$ on the display device 10 corresponds to a left-eye G pixel, then the grating period P of the grating layer 60 corresponding to the left-eye G pixel is set, so that the non-zero-order diffraction obtained by the incident light being diffracted at a position of the grating layer 60 corresponding to the left-eye G pixel is diffracted along the straight line in which $Z_L$, $X_L$ and Y are located. If the point $X_L$ on the display device 10 corresponds to a left-eye B pixel, then the grating period P of the grating layer 60 corresponding to the left-eye B pixel is set, so that the non-zero-order diffraction obtained by the incident light being diffracted at a position of the grating layer 60 corresponding to the left-eye B pixel is diffracted along the straight line in which $Z_L$, $X_L$ and Y are located.

The image at point Y on the virtual screen 70 as viewed by the right eye $Z_R$ of the viewer corresponds to the image at point $X_R$ on the display device 10. In order to make the image at point Y on the virtual screen 70 be seen by the right eye $Z_R$ of the viewer, a light emergent direction at point $X_R$ on the display device 10 needs to be adjusted, so that light at point $X_R$ on the display device 10 is emitted along the straight line in which $Z_R$, $X_R$ and Y are located. The grating period P of the grating layer 60 at a position corresponding to the point $X_R$ can be set, and the diffraction angle θ of the non-zero-order diffraction obtained by the incident light being diffracted at the position of the grating layer 60 corresponding to the point $X_R$ can be adjusted, such that light of the non-zero-order diffraction is emitted along the straight line in which $Z_R$, $X_R$ and Y are located, and that the image at point Y on the virtual screen 70 is seen by the right eye $Z_R$ of the viewer.

If the point $X_R$ on the display device 10 corresponds to a right-eye R pixel, then the grating period P of the grating layer 60 corresponding to the right-eye R pixel is set, so that the non-zero-order diffraction obtained by the incident light being diffracted at a position of the grating layer 60 corresponding to the right-eye R pixel is diffracted along the straight line in which $Z_R$, $X_R$ and Y are located. If the point $X_R$ on the display device 10 corresponds to a right-eye G pixel, then the grating period P of the grating layer 60 corresponding to the right-eye G pixel is set, so that the non-zero-order diffraction obtained by the incident light being diffracted at a position of the grating layer 60 corresponding to the right-eye G pixel is diffracted along the straight line in which $Z_R$, $X_R$ and Y are located. If the point $X_R$ on the display device 10 corresponds to a right-eye B pixel, then the grating period P of the grating layer 60 corresponding to the right-eye B pixel is set, so that the non-zero-order diffraction obtained by the incident light being diffracted at a position of the grating layer 60 corresponding to the right-eye B pixel is diffracted along the straight line in which $Z_R$, $X_R$ and Y are located.

As shown in FIGS. 1 and 2, the image at point Y on the virtual screen 70 as seen by the left eye $Z_L$ of the viewer is the image displayed at point $X_L$ on the left display area 21, and the image at point Y on the virtual screen 70 as seen by the right eye $Z_R$ of the viewer is the image displayed at point $X_R$ on the right display area 22, wherein the longer the distance from point $X_L$ to $a_L$, the larger the angle with which the light emitted from point $X_L$ needs to be deflected, and the longer the distance from point $X_R$ to $a_R$, the larger the angle with which the light emitted from point $X_R$ needs to be deflected. In the embodiment of the present disclosure, along the direction from the center $a_L$ of the left-eye field-of-view central area $A_L$ to the non left-eye field-of-view central area, the grating period of the left-eye R grating region, the grating period of the left-eye G grating region, and the grating period of the left-eye B grating region all decrease gradually; along the direction from the center $a_R$ of the right-eye field-of-view central area $A_R$ to the non right-eye field-of-view central area, the grating period of the right-eye R grating region, the grating period of the right-eye G grating region, and the grating period of the right-eye B grating region all decrease gradually. That is, in the left display area 21, the farther from the center $a_L$ of the left-eye field-of-view central area $A_L$, the smaller the grating period of the left-eye R grating region, the grating period of the left-eye G grating region, and the grating period of the left-eye B grating region; in the right display area 22, the farther from the center $a_R$ of the right-eye field-of-view central area $A_R$, the smaller the grating period of the right-eye R grating region, the grating period of the right-eye G grating region, and the grating period of the right-eye B grating region; accordingly, in the left display area 21, light emitted from points farther from the center $a_L$ of the left-eye field-of-view central area $A_L$ have larger deflection angles; and in the right display area 22, light emitted from points farther from the center $a_R$ of the right-eye field-of-view central area $A_R$ have larger deflection angles. As a result, light emitted by the display device 10 from a position corresponding to the left-eye R pixels, light emitted by the display device 10 from a position corresponding to the left-eye G pixels, and light emitted by the display device 10 from a position corresponding to the left-eye B pixels are all directed to the left eye $Z_L$ of the viewer; light emitted by the display device 10 from a position corresponding to the right-eye R pixels, light emitted by the display device 10 from a position corresponding to the right-eye G pixels, and light emitted by the display device 10 from a position corresponding to the right-eye B pixels are all directed to the right eye $Z_R$ of the viewer.

It can be seen from above that a grating layer 60 is arranged in the display device 10 provided in the embodiment of the present disclosure, and by setting the grating periods of the respective positions of the grating layer 60, the diffraction effect occurred when light is propagating in the display device 10 can be controlled, thereby controlling light propagation in the display device 10 and controlling the light emitted by the display device 10. That is, in the embodiment of the present disclosure, a structure designed on the basis of the physical optics principle is used to control light propagation in the display device 10. Compared to the structure designed on the basis of the geometrical optics principle for controlling propagation of light in the display device 10 in the prior art, the structure designed on the basis of the physical optics principle has higher ability in controlling propagation of light in the display device 10, so it can better control propagation of light in the display device 10, improve the effect of controlling of light propagation in the display device 10, thus improving the on-the-spot effect of the display of the display device 10 and the immersion of the viewer. As a result, viewing experience of the viewer is improved by bringing more real and comfortable viewing experience to the viewer.

It shall be noted that the incident light incident on the grating layer 60 is diffracted at the grating layer 60 to obtain a kth-order diffraction (k=0, ±1, ±2K). When adjusting the light emergent direction at each of the positions on the display device 10, the grating period in an area of the grating layer corresponding to the position is usually adjusted so as to adjust a diffraction angle of a non-zero-order diffraction obtained by the incident light being diffracted in the area of the grating layer 60 corresponding to the position. For example, usually the grating period in the area of the grating layer 60 corresponding to the position is adjusted so as to adjust the diffraction angles of first-order diffraction, second-order diffraction, third-order diffraction, and so on. In practical applications, the incident light incident on the grating layer 60 is diffracted at the grating layer 60 to obtain a kth-order diffraction (k=0, ±1, ±2K), wherein the zero-order diffraction has the highest intensity, and as |k| increases, the intensity of the kth-order diffraction decreases gradually, and generally speaking, there is a difference of one or several orders of magnitude between the intensity of second-order diffraction and the intensity of first-order diffraction, i.e. the intensity of the second-order diffraction is much smaller than that of the first-order diffraction. Therefore, when adjusting the diffraction angles of the non-zero diffractions obtained by the incident light being diffracted in the area of the grating layer 60 corresponding to the position, just the diffraction angle of the first-order diffraction needs to be adjusted.

In an embodiment of the present disclosure, an example about adjusting a diffraction angle of a first-order diffraction obtained by diffraction of the incident light passing through the grating layer 60 is described, and an example about respectively adjusting an intensity of a zero-order diffraction and an intensity of a first-order diffraction obtained by diffraction of the incident light passing through the grating layer 60 is described.

It shall be noted that the display device 10 provided in the embodiment of the present disclosure can be applied to a near eye display device, for example, it can be applied to a head-mounted near eye display device (such as helmet display device, glass-type display device) for realizing 3D display. Curved-surface 3D display or spherical 3D display can be realized, for example.

In the above embodiment, according to different functions of the display device 10 and different positions of the viewing area in front of the display device 10, the grating layer 60 can be set in different ways. Three arrangements of the grating layer 60 are described below as examples, but the arrangements of the grating layer 60 are not limited to these three.

In one arrangement of the grating layer 60, referring to FIGS. 1-4, along a direction parallel to a line between the center $a_L$ of the left-eye field-of-view central area $A_L$ and the center $a_R$ of the right-eye field-of-view central area $A_R$, from the center $a_L$ of the left-eye field-of-view central area $A_L$ to both sides of the left display area 21, the grating period of the left-eye R grating region, the grating period of the left-eye G grating region, and the grating period of the left-eye B grating region all decrease gradually. Along a direction parallel to a line between the center $a_L$ of the left-eye field-of-view central area $A_L$ and the center $a_R$ of the right-eye field-of-view central area $A_R$, from the center $a_R$ of the right-eye field-of-view central area $A_R$ to both sides of the right display area 22, the grating period of the right-eye R grating region, the grating period of the right-eye G grating region, and the grating period of the right-eye B grating region all decrease gradually.

Specifically, still referring to FIG. 2, the direction parallel to the line between the center $a_L$ of the left-eye field-of-view central area $A_L$ and the center $a_R$ of the right-eye field-ofview central area $A_R$ is a direction parallel to a line between the left eye $Z_L$ and the right eye $Z_R$ of the viewer, and it is also the left and right direction in FIG. 2. In practical applications, it also can be considered that the direction parallel to the line between the center $a_L$ of the left-eye field-of-view central area $A_L$ and the center $a_R$ of the right-eye field-of-view central area $A_R$ is a lateral direction of the display device 10.

An example that the display panel 20 has a size of 5.5 inches is described in detail. The display panel 20 has a width of 14.16 cm and a height of 7.12 cm. As shown in FIG. 2, the left and right direction in FIG. 2 is the width direction of the display panel 20, and the up and down direction in FIG. 2 is the height direction of the display panel 20, and the left display area 21 and the right display area 22 each occupy a half of the display panel 20 along the left and right direction in FIG. 2. When a viewer is viewing an image displayed by the display device 10, the line between the left eye $Z_L$ and the right eye $Z_R$ of the viewer is parallel to the width direction of the display panel 20. Thus it can be considered that the direction parallel to the line between the left eye $Z_L$ and the right eye $Z_R$ of the viewer is the lateral direction of the display device 10, and direction perpendicular to the line between both eyes of the viewer is a longitudinal direction of the display device 10, namely, the left and right direction in FIG. 2 is the lateral direction of the display device 10, and the up and down direction in FIG. 2 is the longitudinal direction of the display device 10.

When the viewer is viewing an image displayed by the display device 10, a distance between the viewer and the display device 10 may be greater than 0 cm and smaller than 20 cm. In order to enable the viewer to have a good viewing angle, the distance between the viewer and the display device 10 can optionally be 5 cm. Specifically, in this embodiment, the distance between the viewer and the display device 10 is actually the distance between the left eye $Z_L$ or right eye $Z_R$ of the viewer and the display device 10.

A vertical line $q_{L1}$ is provided through the center $a_L$ of the left-eye field-of-view central area $A_L$ in FIG. 2. Along the left and right direction in FIG. 2, from the vertical line $q_{L1}$ to the left and right sides of the left display area 21 in FIG. 2, the grating period of the left-eye R grating region, the grating period of the left-eye G grating region, and the grating period of the left-eye B grating region all decrease gradually. That is, along the left and right direction in FIG. 2, the farther from the vertical line $q_{L1}$, the larger the diffraction angle of the first-order diffraction obtained by diffraction of the incident light when passing through the left-eye R grating region, the larger the diffraction angle of the first-order diffraction obtained by diffraction of the incident light when passing through the left-eye G grating region, and the larger the diffraction angle of the first-order diffraction obtained by diffraction of the incident light when passing through the left-eye B grating region, which are corresponding to the angles by which the light emitted from different positions on the display device 10 need to deflect towards the left eye $Z_L$ of the viewer as shown by the curve q1 in FIG. 4 along the left and right direction in FIG. 2.

Figure 4:
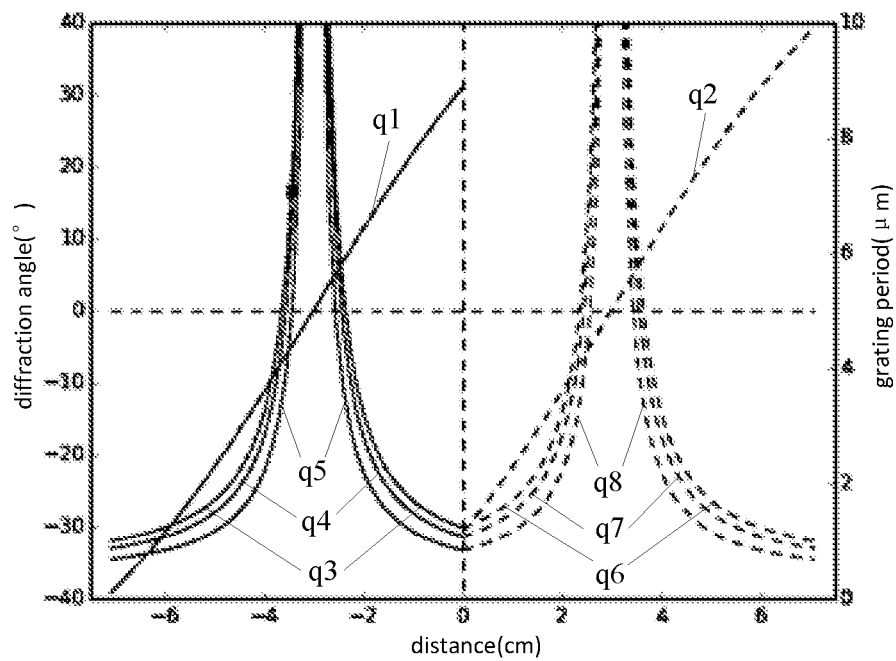
FIG. 4 is a graph of a grating period of a grating layer in the display device as shown in FIG. 3.

Along the left and right direction in FIG. 2, a distribution curve of the grating period of the left-eye R grating region can be obtained from the curve q1 in FIG. 4 and formula (1). As shown by the curve q3 in FIG. 4, an area of the left-eye R grating region corresponding to the vertical line $q_{L1}$ has the largest grating period, and areas of the left-eye R grating region corresponding to the left and right sides of the left display area 21 in FIG. 2 have smaller grating periods. For example, the area of the left-eye R grating region corresponding to the vertical line $q_{L1}$ may have a grating period greater than or equal to 50 μm, and the areas of the left-eye R grating region corresponding to the left and right sides of the left display area 21 in FIG. 2 may have a grating period of 1 μm.

Along the left and right direction in FIG. 2, a distribution curve of the grating period of the left-eye G grating region can be obtained from the curve q1 in FIG. 4 and formula (1). As shown by the curve q4 in FIG. 4, an area of the left-eye G grating region corresponding to the vertical line $q_{L1}$ has the largest grating period, and areas of the left-eye G grating region corresponding to the left and right sides of the left display area 21 in FIG. 2 have smaller grating periods. For example, the area of the left-eye G grating region corresponding to the vertical line $q_{L1}$ may have a grating period greater than or equal to 50 μm, and the areas of the left-eye G grating region corresponding to the left and right sides of the left display area 21 in FIG. 2 may have a grating period of 0.8 μm.

Along the left and right direction in FIG. 2, a distribution curve of the grating period of the left-eye B grating region can be obtained from the curve q1 in FIG. 4 and formula (1). As shown by the curve q5 in FIG. 4, an area of the left-eye B grating region corresponding to the vertical line $q_{L1}$ has the largest grating period, and areas of the left-eye B grating region corresponding to the left and right sides of the left display area 21 in FIG. 2 have smaller grating periods. For example, the area of the left-eye B grating region corresponding to the vertical line $q_{L1}$ may have a grating period greater than or equal to 50 μm, and the areas of the left-eye B grating region corresponding to the left and right sides of the left display area 21 in FIG. 2 may have a grating period of 0.6 μm.

A vertical line $q_{R1}$ is provided through the center $a_R$ of the right-eye field-of-view central area $A_R$ in FIG. 2. Along the left and right direction in FIG. 2, from the vertical line $q_{R1}$ to the left and right sides of the right display area 22 in FIG. 2, the grating period of the right-eye R grating region, the grating period of the right-eye G grating region, and the grating period of the right-eye B grating region all decrease gradually. That is, along the left and right direction in FIG. 2, the farther from the vertical line $q_{R1}$, the larger the diffraction angle of the first-order diffraction obtained by diffraction of the incident light when passing through the right-eye R grating region, the larger the diffraction angle of the first-order diffraction obtained by diffraction of the incident light when passing through the right-eye G grating region, and the larger the diffraction angle of the first-order diffraction obtained by diffraction of the incident light when passing through the right-eye B grating region, which are corresponding to the angles by which the light emitted from different positions on the display device 10 need to deflect towards the right eye $Z_R$ of the viewer as shown by the curve q2 in FIG. 4 along the left and right direction in FIG. 2.

Along the left and right direction in FIG. 2, a distribution curve of the grating period of the right-eye R grating region can be obtained from the curve q2 in FIG. 4 and formula (1). As shown by the curve q6 in FIG. 4, an area of the right-eye R grating region corresponding to the vertical line $q_{R1}$ has the largest grating period, and areas of the right-eye R grating region corresponding to the left and right sides of the right display area 22 in FIG. 2 have smaller grating periods. For example, the area of the right-eye R grating region corresponding to the vertical line $q_{R1}$ may have a grating period greater than or equal to 50 μm, and the areas of the right-eye R grating region corresponding to the left and right sides of the right display area 22 in FIG. 2 may have a grating period of 1 μm.

Along the left and right direction in FIG. 4, a distribution curve of the grating period of the right-eye G grating region can be obtained from the curve q2 in FIG. 4 and formula (1). As shown by the curve q7 in FIG. 4, an area of the right-eye G grating region corresponding to the vertical line $q_{R1}$ has the largest grating period, and areas of the right-eye G grating region corresponding to the left and right sides of the right display area 22 in FIG. 2 have smaller grating periods. For example, the area of the right-eye G grating region corresponding to the vertical line $q_{R1}$ may have a grating period greater than or equal to 50 μm, and the areas of the right-eye G grating region corresponding to the left and right sides of the right display area 22 in FIG. 2 may have a grating period of 0.8 μm.

Along the left and right direction in FIG. 4, a distribution curve of the grating period of the right-eye B grating region can be obtained from the curve q2 in FIG. 4 and formula (1). As shown by the curve q8 in FIG. 4, an area of the right-eye B grating region corresponding to the vertical line $q_{R1}$ has the largest grating period, and areas of the right-eye B grating region corresponding to the left and right sides of the right display area 22 in FIG. 2 have smaller grating periods. For example, the area of the right-eye B grating region corresponding to the vertical line $q_{R1}$ may have a grating period greater than or equal to 50 μm, and the areas of the right-eye B grating region corresponding to the left and right sides of the right display area 22 in FIG. 2 may have a grating period of 0.6 μm.

In such an arrangement of the grating layer 60, by setting the grating period of the left-eye R grating region, the grating period of the left-eye G grating region, the grating period of the left-eye B grating region, grating period of the right-eye R grating region, the grating period of the right-eye G grating region, the grating period of the right-eye B grating region, respectively, the red light obtained through the left-eye R pixels and the right-eye R pixels, the green light obtained through the left-eye G pixels and the right-eye G pixels, and the blue light obtained through the left-eye B pixels and the right-eye B pixels can be adjusted and controlled, so that the red light, green light and blue light emitted from respective positions on the display device 10 travel along preset directions so as to improve the on-the-spot effect of the display of the display device 10 and the immersion of the viewer and improve viewing experience of the viewer to bring more real and comfortable viewing experience to the viewer.

In such an arrangement of the grating layer 60, along the left and right direction in FIG. 2, from the center $a_L$ of the left-eye field-of-view central area $A_L$ to both sides of the left display area 21, the grating period of the left-eye R grating region, the grating period of the left-eye G grating region, and the grating period of the left-eye B grating region all decrease gradually; and from the center $a_R$ of the right-eye field-of-view central area $A_R$ to both sides of the right display area 22, the grating period of the right-eye R grating region, the grating period of the right-eye G grating region, and the grating period of the right-eye B grating region all decrease gradually. Therefore, such an arrangement of the grating layer 60 can enable adjustment of the light emergent direction of the display device 10 along the left and right direction in FIG. 2, thereby improving viewing experience of the viewer along the lateral direction of the display device 10.

In another arrangement of the grating layer 60, still referring to FIGS. 1-3 and 5, along a direction perpendicular to a line between the center $a_L$ of the left-eye field-of-view central area $A_L$ and the center $a_R$ of the right-eye field-of-view central area $A_R$, from the center $a_L$ of the left-eye field-of-view central area $A_L$ to both sides of the left display area 21, the grating period of the left-eye R grating region, the grating period of the left-eye G grating region, and the grating period of the left-eye B grating region all decrease gradually. Along a direction perpendicular to a line between the center $a_L$ of the left-eye field-of-view central area $A_L$ and the center $a_R$ of the right-eye field-of-view central area $A_R$, from the center $a_R$ of the right-eye field-of-view central area $A_R$ to both sides of the right display area 22, the grating period of the right-eye R grating region, the grating period of the right-eye G grating region, and the grating period of the right-eye B grating region all decrease gradually.

Specifically, still referring to FIG. 2, the direction perpendicular to the line between the center $a_L$ of the left-eye field-of-view central area $A_L$ and the center $a_R$ of the right-eye field-of-view central area $A_R$ is a direction perpendicular to a line between the left eye $Z_L$ and the right eye $Z_R$ of the viewer, and it is also the up and down direction in FIG. 2. In practical applications, it can be considered that the direction perpendicular to the line between the center $a_L$ of the left-eye field-of-view central area $A_L$ and the center $a_R$ of the right-eye field-of-view central area $A_R$ is the longitudinal direction of the display device 10.

An example that the display panel 20 has a size of 5.5 inches is described in detail. The display panel 20 has a width of 14.16 cm and a height of 7.12 cm. As shown in FIG. 2, the left and right direction in FIG. 2 is the width direction of the display panel 20, and the up and down direction in FIG. 2 is the height direction of the display panel 20, and the left display area 21 and the right display area 22 each occupy a half of the display panel 20 along the left and right direction in FIG. 2. When the viewer is viewing an image displayed by the display device 10, the line between the left eye $Z_L$ and the right eye $Z_R$ of the viewer is parallel to the width direction of the display panel 20. Thus it can be considered that the direction parallel to the line between the left eye $Z_L$ and the right eye $Z_R$ of the viewer is the lateral direction of the display device 10, and direction perpendicular to the line between both eyes of the viewer is the longitudinal direction of the display device 10, namely, the left and right direction in FIG. 2 is the lateral direction of the display device 10, and the up and down direction in FIG. 2 is the longitudinal direction of the display device 10.

When the viewer is viewing an image displayed by the display device 10, a distance between the viewer and the display device 10 may be greater than 0 cm and smaller than 20 cm. In order to enable the viewer to have a good viewing angle, the distance between the viewer and the display device 10 can optionally be 5 cm. Specifically, in this embodiment, the distance between the viewer and the display device 10 is actually the distance between the left eye $Z_L$ or right eye $Z_R$ of the viewer and the display device 10.

A lateral line $q_{L2}$ is provided through the center $a_L$ of the left-eye field-of-view central area $A_L$ in FIG. 2. Along the up and down direction in FIG. 2, from the lateral line $q_{L2}$ to the upper and lower sides of the left display area 21 in FIG. 2, the grating period of the left-eye R grating region, the grating period of the left-eye G grating region, and the grating period of the left-eye B grating region all decrease gradually. That is, along the up and down direction in FIG. 2, the farther from the lateral line $q_{L2}$, the larger the diffraction angle of the first-order diffraction obtained by diffraction of the incident light when passing through the left-eye R grating region, the larger the diffraction angle of the first-order diffraction obtained by diffraction of the incident light when passing through the left-eye G grating region, and the larger the diffraction angle of the first-order diffraction obtained by diffraction of the incident light when passing through the left-eye B grating region, which are corresponding to the angles by which the light emitted from different positions on the display device 10 need to deflect towards the left eye $Z_L$ of the viewer as shown by the curve q9 in FIG. 5 along the up and down direction in FIG. 2.

Figure 5:
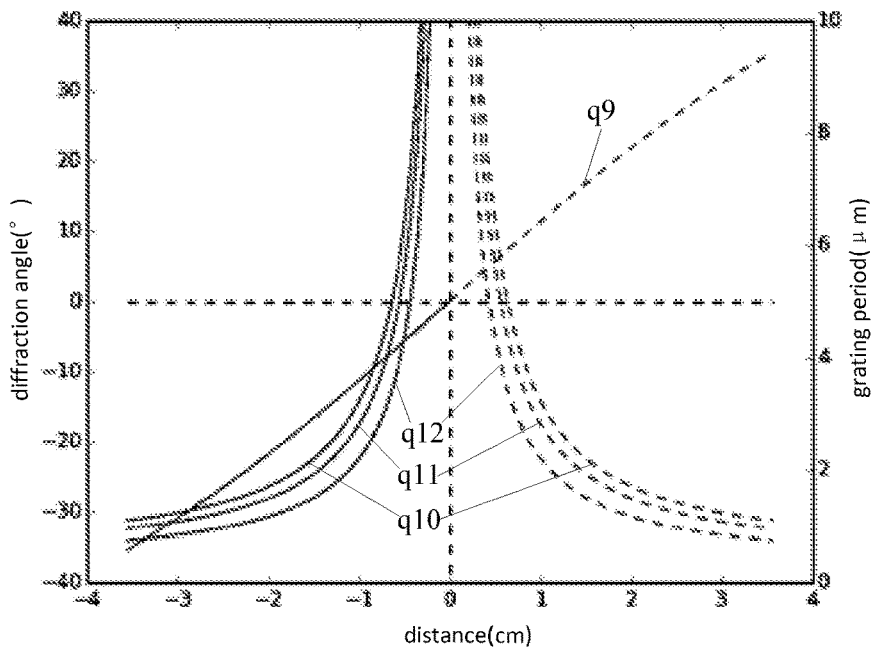
FIG. 5 is a graph of another grating period of a grating layer in the display device as shown in FIG. 3.

Along the up and down direction in FIG. 2, a distribution curve of the grating period of the left-eye R grating region can be obtained from the curve q9 in FIG. 5 and formula (1). As shown by the curve q10 in FIG. 5, an area of the left-eye R grating region corresponding to the lateral line $q_{L2}$ has the largest grating period, and areas of the left-eye R grating region corresponding to the upper and lower sides of the left display area 21 in FIG. 2 have smaller grating periods. For example, the area of the left-eye R grating region corresponding to the lateral line $q_{L2}$ may have a grating period greater than or equal to 50 μm, and the areas of the left-eye R grating region corresponding to the upper and lower sides of the left display area 21 in FIG. 2 may have a grating period of 1.1 μm.

Along the up and down direction in FIG. 2, a distribution curve of the grating period of the left-eye G grating region can be obtained from the curve q9 in FIG. 5 and formula (1). As shown by the curve q11 in FIG. 5, an area of the left-eye G grating region corresponding to the lateral line $q_{L2}$ has the largest grating period, and areas of the left-eye G grating region corresponding to the upper and lower sides of the left display area 21 in FIG. 2 have smaller grating periods. For example, the area of the left-eye G grating region corresponding to the lateral line $q_{L2}$ may have a grating period greater than or equal to 50 μm, and the areas of the left-eye G grating region corresponding to the upper and lower sides of the left display area 21 in FIG. 2 may have a grating period of 0.9 μm.

Along the up and down direction in FIG. 4, a distribution curve of the grating period of the left-eye B grating region can be obtained from the curve q9 in FIG. 5 and formula (1). As shown by the curve q12 in FIG. 5, an area of the left-eye B grating region corresponding to the lateral line $q_{L2}$ has the largest grating period, and areas of the left-eye B grating region corresponding to the upper and lower sides of the left display area 21 in FIG. 2 have smaller grating periods. For example, the area of the left-eye B grating region corresponding to the lateral line $q_{L2}$ may have a grating period greater than or equal to 50 μm, and the areas of the left-eye B grating region corresponding to the upper and lower sides of the left display area 21 in FIG. 2 may have a grating period of 0.7 μm.

A lateral line $q_{R2}$ is provided through the center $a_R$ of the right-eye field-of-view central area $A_R$ in FIG. 2. Along the up and down direction in FIG. 2, from the lateral line $q_{R2}$ to the upper and lower sides of the right display area 22 in FIG. 2, the grating period of the right-eye R grating region, the grating period of the right-eye G grating region, and the grating period of the right-eye B grating region all decrease gradually. That is, along the up and down direction in FIG. 2, the farther from the lateral line $q_{R2}$, the larger the diffraction angle of the first-order diffraction obtained by diffraction of the incident light when passing through the right-eye R grating region, the larger the diffraction angle of the first-order diffraction obtained by diffraction of the incident light when passing through the right-eye G grating region, and the larger the diffraction angle of the first-order diffraction obtained by diffraction of the incident light when passing through the right-eye B grating region.

The center $a_R$ of the right-eye field-of-view central area $A_R$ and the center $a_L$ of the left-eye field-of-view central area $A_L$ are in the same straight line, and the line between the center $a_R$ of the right-eye field-of-view central area $A_R$ and the center $a_L$ of the left-eye field-of-view central area $A_L$ is parallel to the left and right direction of FIG. 2, so in the right display area 22, along the up and down direction of FIG. 2, from the lateral line $q_{R2}$ of FIG. 2 to the upper and lower sides of the right display area 22, the grating period of the right-eye R grating region and the grating period of the left-eye R grating region are the same, the grating period of the right-eye G grating region and the grating period of the left-eye G grating region are the same, and the grating period of the right-eye B grating region and the grating period of the left-eye B grating region are the same. Namely, along the up and down direction in FIG. 2, from the lateral line $q_{R2}$ of FIG. 2 to the upper and lower sides of the right display area 22, values of the grating periods of the right-eye R grating region at different positions of the right display area 22 can be corresponding to the curve q10 in FIG. 5, values of the grating periods of the right-eye G grating region at different positions of the right display area 22 can be corresponding to the curve q11 in FIG. 5, and values of the grating periods of the right-eye B grating region at different positions of the right display area 22 can be corresponding to the curve q12 in FIG. 5.

In such an arrangement of the grating layer 60, by setting the grating period of the left-eye R grating region, the grating period of the left-eye G grating region, the grating period of the left-eye B grating region, grating period of the right-eye R grating region, the grating period of the right-eye G grating region, the grating period of the right-eye B grating region, respectively, the red light obtained through the left-eye R pixels and the right-eye R pixels, the green light obtained through the left-eye G pixels and the right-eye G pixels, and the blue light obtained through the left-eye B pixels and the right-eye B pixels can be adjusted and controlled, so that the red light, green light and blue light emitted from respective positions on the display device 10 travel along preset directions so as to improve the on-the-spot effect of the display of the display device 10 and the immersion of the viewer and improve viewing experience of the viewer to bring more real and comfortable viewing experience to the viewer.

In such an arrangement of the grating layer 60, along the up and down direction in FIG. 2, from the center $a_L$ of the left-eye field-of-view central area $A_L$ to both sides of the left display area 21, the grating period of the left-eye R grating region, the grating period of the left-eye G grating region, and the grating period of the left-eye B grating region all decrease gradually; and from the center $a_R$ of the right-eye field-of-view central area $A_R$ to both sides of the right display area 22, the grating period of the right-eye R grating region, the grating period of the right-eye G grating region, and the grating period of the right-eye B grating region all decrease gradually. Therefore, such an arrangement of the grating layer 60 can enable adjustment of the light emergent direction of the display device 10 along the up and down direction in FIG. 2, thereby improving viewing experience of the viewer along the up and down direction in FIG. 2.

The display device 10 provided by the arrangement of the grating layer 60 as shown in FIG. 4 can improve the viewing experience of the viewer along the left and right direction of FIG. 2, and the display device 10 provided by the arrangement of the grating layer 60 as shown in FIG. 5 can improve the viewing experience of the viewer along the up and down direction of FIG. 2. In practical applications, the viewing experience of the viewer along the left and right direction and along the up and down direction of FIG. 2 can be improved simultaneously.

In still another arrangement of the grating layer 60, along the direction parallel to the line between the center $a_L$ of the left-eye field-of-view central area $A_L$ and the center $a_R$ of the right-eye field-of-view central area $A_R$, from the center $a_L$ of the left-eye field-of-view central area $A_L$ to both sides of the left display area 21, the grating period of the left-eye R grating region, the grating period of the left-eye G grating region, and the grating period of the left-eye B grating region all decrease gradually; along the direction parallel to the line between the center $a_L$ of the left-eye field-of-view central area $A_L$ and the center $a_R$ of the right-eye field-of-view central area $A_R$, from the center $a_R$ of the right-eye field-of-view central area $A_R$ to both sides of the right display area 22, the grating period of the right-eye R grating region, the grating period of the right-eye G grating region, and the grating period of the right-eye B grating region all decrease gradually; along the direction perpendicular to the line between the center $a_L$ of the left-eye field-of-view central area $A_L$ and the center $a_R$ of the right-eye field-of-view central area $A_R$, from the center $a_L$ of the left-eye field-of-view central area $A_L$ to both sides of the left display area 21, the grating period of the left-eye R grating region, the grating period of the left-eye G grating region, and the grating period of the left-eye B grating region all decrease gradually; along the direction perpendicular to the line between the center $a_L$ of the left-eye field-of-view central area $A_L$ and the center $a_R$ of the right-eye field-of-view central area $A_R$, from the center $a_R$ of the right-eye field-of-view central area $A_R$ to both sides of the right display area 22, the grating period of the right-eye R grating region, the grating period of the right-eye G grating region, and the grating period of the right-eye B grating region all decrease gradually Specifically, still referring to FIG. 2, the direction of the line between the center $a_L$ of the left-eye field-of-view central area $A_L$ and the center $a_R$ of the right-eye field-of-view central area $A_R$ is the direction of the line between the left eye $Z_L$ and the right eye $Z_R$ of the viewer, and it is also the left and right direction in FIG. 2. That is, the direction parallel to the line between the center $a_L$ of the left-eye field-of-view central area $A_L$ and the center $a_R$ of the right-eye field-of-view central area $A_R$ is the direction parallel to the line between the left eye $Z_L$ and the right eye $Z_R$ of the viewer, and is also the left and right direction in FIG. 2; and the direction perpendicular to the line between the center $a_L$ of the left-eye field-of-view central area $A_L$ and the center $a_R$ of the right-eye field-of-view central area $A_R$ is the direction perpendicular to the line between the left eye $Z_L$ and the right eye $Z_R$ of the viewer, and it is also the up and down direction in FIG. 2. In practical applications, it can be also considered that the direction parallel to the line between the center $a_L$ of the left-eye field-of-view central area $A_L$ and the center $a_R$ of the right-eye field-of-view central area $A_R$ is the lateral direction of the display device 10, and the direction perpendicular to the line between the center $a_L$ of the left-eye field-of-view central area $A_L$ and the center $a_R$ of the right-eye field-of-view central area $A_R$ is the longitudinal direction of the display device 10.

In such an arrangement of the grating layer 60, the grating period of the grating layer 60 is set along the left and right direction and the up and down direction in FIG. 2, so in such an arrangement of the grating layer 60, the light emergent direction of the display device 10 can be adjusted along both the left and right direction and the up and down direction in FIG. 2, thereby improving the viewing experience of the viewer along the left and right direction and the up and down direction in FIG. 2 and in turn improving the viewing experience of the viewer along the lateral direction and the longitudinal direction of the display device 10. Along the left and right direction of FIG. 2, the grating period of the left-eye R grating region, the grating period of the left-eye G grating region, the grating period of the left-eye B grating region are set in a way similar to that of the grating layer 60 as shown in FIG. 4, and the grating period of the right-eye R grating region, the grating period of the right-eye G grating region, the grating period of the right-eye B grating region are set in a way similar to that of the grating layer 60 as shown in FIG. 4, which will not be elaborated any more. Along the up and down direction of FIG. 2, the grating period of the left-eye R grating region, the grating period of the left-eye G grating region, the grating period of the left-eye B grating region are set in a way similar to that of the grating layer 60 as shown in FIG. 5, and the grating period of the right-eye R grating region, the grating period of the right-eye G grating region, the grating period of the right-eye B grating region are set in a way similar to that of the grating layer 60 as shown in FIG. 5, which will not be elaborated any more.

In the above embodiment, the left display area 21 of the display panel 20 comprises a plurality of left-eye R pixels, a plurality of left-eye G pixels, a plurality of left-eye B pixels arranged as an array therein. The plurality of left-eye R pixels, the plurality of left-eye G pixels, the plurality of left-eye B pixels can be arranged in various ways, i.e. in the left display area 21, the left-eye pixels can be arranged in various ways.

In one way of arrangement of the left-eye pixels, the plurality of left-eye R pixels, the plurality of left-eye G pixels, the plurality of left-eye B pixels are arranged in the left display area 21 to form an array of left-eye pixels. Rows of pixels of the array of left-eye pixels extend along the direction parallel to the line between the center $a_L$ of the left-eye field-of-view central area $A_L$ and the center $a_R$ of the right-eye field-of-view central area $A_R$, columns of pixels of the array of left-eye pixels extend along the direction perpendicular to the line between the center $a_L$ of the left-eye field-of-view central area $A_L$ and the center $a_R$ of the right-eye field-of-view central area $A_R$. Each row of pixels of the array of left-eye pixels includes a plurality of left-eye R pixels, a plurality of left-eye G pixels and a plurality of left-eye B pixels that are arranged alternately. Each column of pixels of the array of left-eye pixels includes one type of the left-eye R pixels, the left-eye G pixels and the left-eye B pixels.

Specifically, the direction parallel to the line between the center $a_L$ of the left-eye field-of-view central area $A_L$ and the center $a_R$ of the right-eye field-of-view central area $A_R$ is the left and right direction in FIG. 2, and the direction perpendicular to the line between the center $a_L$ of the left-eye field-of-view central area $A_L$ and the center $a_R$ of the right-eye field-of-view central area $A_R$ is the up and down direction in FIG. 2, rows of pixels of the array of left-eye pixels extend along the left and right direction in FIG. 2, and columns of pixels of the array of left-eye pixels extend along the up and down direction in FIG. 2. The array of left-eye pixels include a plurality of rows of pixels and a plurality of columns of pixels, each row of pixels including a plurality of left-eye R pixels, a plurality of left-eye G pixels and a plurality of left-eye B pixels that are arranged alternately, and each column of pixels including only one type of left-eye R pixels, the left-eye G pixels and the left-eye B pixels. That is, the array of left-eye pixels include a plurality of columns of left-eye R pixels, a plurality of columns of left-eye G pixels and a plurality of columns of left-eye B pixels that are arranged alternately, the columns of left-eye R pixels consisting of a plurality of left-eye R pixels arranged along the up and down direction in FIG. 2, the columns of left-eye G pixels consisting of a plurality of left-eye G pixels arranged along the up and down direction in FIG. 2, and the columns of left-eye B pixels consisting of a plurality of left-eye B pixels arranged along the up and down direction in FIG. 2.

When the left-eye pixels in the left display area 21 are arranged in this way of arrangement of the left-eye pixels, and the grating layer 60 is arranged in the way for the grating layer 60 as shown in FIG. 4, the left grating region 61 of the grating layer 60 comprises a plurality of left grating bulges 63, which are bar-shaped grating bulges 63, the left grating bulges 63 extend along the up and down direction of FIG. 2, and the left grating bulges 63 are arranged in parallel along the left and right direction of FIG. 2. In this case, the left grating bulges 63 of the left-eye R grating region, the left grating bulges 63 of the left-eye G grating region, the left grating bulges 63 of the left-eye B grating region are all bar-shaped grating bulges, and the left grating bulges 63 of the left-eye R grating region, the left grating bulges 63 of the left-eye G grating region, the left grating bulges 63 of the left-eye B grating region are all extending along the up and down direction in FIG. 2, and the left grating bulges 63 of the left-eye R grating region, the left grating bulges 63 of the left-eye G grating region, the left grating bulges 63 of the left-eye B grating region are all arranged in parallel along the left and right direction in FIG. 2.

In another way of arrangement of the left-eye pixels, the plurality of left-eye R pixels, the plurality of left-eye G pixels, the plurality of left-eye B pixels are arranged in the left display area 21 to form an array of left-eye pixels. Rows of pixels of the array of left-eye pixels extend along the direction parallel to the line between the center $a_L$ of the left-eye field-of-view central area $A_L$ and the center $a_R$ of the right-eye field-of-view central area $A_R$, columns of pixels of the array of left-eye pixels extend along the direction perpendicular to the line between the center $a_L$ of the left-eye field-of-view central area $A_L$ and the center $a_R$ of the right-eye field-of-view central area $A_R$. Each row of pixels of the array of left-eye pixels includes one type of the left-eye R pixels, the left-eye G pixels and the left-eye B pixels. Each column of pixels of the array of left-eye pixels includes a plurality of left-eye R pixels, a plurality of left-eye G pixels and a plurality of left-eye B pixels that are arranged alternately.

Specifically, the direction parallel to the line between the center $a_L$ of the left-eye field-of-view central area $A_L$ and the center $a_R$ of the right-eye field-of-view central area $A_R$ is the left and right direction in FIG. 2, and the direction perpendicular to the line between the center $a_L$ of the left-eye field-of-view central area $A_L$ and the center $a_R$ of the right-eye field-of-view central area $A_R$ is the up and down direction in FIG. 2, rows of pixels of the array of left-eye pixels extend along the left and right direction in FIG. 2, and columns of pixels of the array of left-eye pixels extend along the up and down direction in FIG. 2. The array of left-eye pixels include a plurality of rows of pixels and a plurality of columns of pixels, each row of pixels including only one type of left-eye R pixels, the left-eye G pixels and the left-eye B pixels, while each column of pixels including a plurality of left-eye R pixels, a plurality of left-eye G pixels and a plurality of left-eye B pixels that are arranged alternately. That is, the array of left-eye pixels include a plurality of rows of left-eye R pixels, a plurality of rows of left-eye G pixels and a plurality of rows of left-eye B pixels that are arranged alternately, the rows of left-eye R pixels consisting of a plurality of left-eye R pixels arranged along the left and right direction in FIG. 2, the rows of left-eye G pixels consisting of a plurality of left-eye G pixels arranged along the left and right direction in FIG. 2, and the rows of left-eye B pixels consisting of a plurality of left-eye B pixels arranged along the left and right direction in FIG. 2.

When the left-eye pixels in the left display area 21 are arranged in this way of arrangement of the left-eye pixels, and the grating layer 60 is arranged in the way for the grating layer 60 as shown in FIG. 5, the left grating region 61 of the grating layer 60 comprises a plurality of left grating bulges 63, which are bar-shaped grating bulges, the left grating bulges 63 extend along the left and right direction of FIG. 2, and the left grating bulges 63 are arranged in parallel along the up and down direction of FIG. 2. Then the left grating bulges 63 of the left-eye R grating region, the left grating bulges 63 of the left-eye G grating region, the left grating bulges 63 of the left-eye B grating region are all bar-shaped grating bulges, and the left grating bulges 63 of the left-eye R grating region, the left grating bulges 63 of the left-eye G grating region, the left grating bulges 63 of the left-eye B grating region are all extending along the left and right direction in FIG. 2, and the left grating bulges 63 of the left-eye R grating region, the left grating bulges 63 of the left-eye G grating region, the left grating bulges 63 of the left-eye B grating region are all arranged in parallel along the up and down direction in FIG. 2.

In yet another way of arrangement of the left-eye pixels, the plurality of left-eye R pixels, the plurality of left-eye G pixels, the plurality of left-eye B pixels are arranged in the left display area 21 to form an array of left-eye pixels. Rows of pixels of the array of left-eye pixels extend along the direction parallel to the line between the center $a_L$ of the left-eye field-of-view central area $A_L$ and the center $a_R$ of the right-eye field-of-view central area $A_R$, columns of pixels of the array of left-eye pixels extend along the direction perpendicular to the line between the center $a_L$ of the left-eye field-of-view central area $A_L$ and the center $a_R$ of the right-eye field-of-view central area $A_R$. Rows of pixels of the array of left-eye pixels include a plurality of left-eye R pixels, a plurality of left-eye G pixels and a plurality of left-eye B pixels that are arranged alternately. Columns of pixels of the array of left-eye pixels include a plurality of left-eye R pixels, a plurality of left-eye G pixels and a plurality of left-eye B pixels that are arranged alternately.

It shall be noted that in the above embodiment, when the left-eye R pixels, the left-eye G pixels, the left-eye B pixels are arranged alternately, the arrangement may be in the order of the left-eye R pixels, the left-eye G pixels, the left-eye B pixels, or the arrangement may be in the order of the left-eye R pixels, the left-eye B pixels, the left-eye G pixels, or the arrangement may be in the order of the left-eye G pixels, the left-eye R pixels, the left-eye B pixels. In practical applications, other alternating arrangements may be adopted, which are not limited herein.

The right display area 22 of the display panel 20 comprises a plurality of right-eye R pixels, a plurality of right-eye G pixels, a plurality of right-eye B pixels arranged as an array therein. The plurality of right-eye R pixels, the plurality of right-eye G pixels, and the plurality of right-eye B pixels can be arranged in various ways, i.e. in the right display area 22, the right-eye pixels can be arranged in various ways.

In one way of arrangement of the right-eye pixels, the plurality of right-eye R pixels, the plurality of right-eye G pixels, and the plurality of right-eye B pixels are arranged in the right display area 22 to form an array of right-eye pixels. Rows of pixels of the array of right-eye pixels extend along the direction parallel to the line between the center $a_L$ of the left-eye field-of-view central area $A_L$ and the center $a_R$ of the right-eye field-of-view central area $A_R$, and columns of pixels of the array of right-eye pixels extend along the direction perpendicular to the line between the center $a_L$ of the left-eye field-of-view central area $A_L$ and the center $a_R$ of the right-eye field-of-view central area $A_R$. Each row of pixels of the array of right-eye pixels includes a plurality of right-eye R pixels, a plurality of right-eye G pixels and a plurality of right-eye B pixels that are arranged alternately. Each column of pixels of the array of right-eye pixels includes one type of the right-eye R pixels, the right-eye G pixels and the right-eye B pixels.

Specifically, the direction parallel to the line between the center $a_L$ of the left-eye field-of-view central area $A_L$ and the center $a_R$ of the right-eye field-of-view central area $A_R$ is the left and right direction in FIG. 2, and the direction perpendicular to the line between the center $a_L$ of the left-eye field-of-view central area $A_L$ and the center $a_R$ of the right-eye field-of-view central area $A_R$ is the up and down direction in FIG. 2. Rows of pixels of the array of right-eye pixels extend along the left and right direction in FIG. 2, and columns of pixels of the array of right-eye pixels extend along the up and down direction in FIG. 2. The array of right-eye pixels include a plurality of rows of pixels and a plurality of columns of pixels, each row of pixels including a plurality of right-eye R pixels, a plurality of right-eye G pixels and a plurality of right-eye B pixels that are arranged alternately, and each column of pixels including only one type of right-eye R pixels, the right-eye G pixels and the right-eye B pixels. That is, the array of right-eye pixels includes a plurality of columns of right-eye R pixels, a plurality of columns of right-eye G pixels and a plurality of columns of right-eye B pixels that are arranged alternately, the columns of right-eye R pixels consisting of a plurality of right-eye R pixels arranged along the up and down direction in FIG. 2, the columns of right-eye G pixels consisting of a plurality of right-eye G pixels arranged along the up and down direction in FIG. 2, and the columns of right-eye B pixels consisting of a plurality of right-eye B pixels arranged along the up and down direction in FIG. 2.

When the right-eye pixels in the right display area 22 are arranged in this way of arrangement of the right-eye pixels, and the grating layer 60 is arranged in the way for the grating layer 60 as shown in FIG. 4, the right grating region 62 of the grating layer 60 comprises a plurality of right grating bulges 64, which are bar-shaped grating bulges, the right grating bulges 64 extend along the up and down direction of FIG. 2, and the right grating bulges 64 are arranged in parallel along the left and right direction of FIG. 2. In this case, the right grating bulges 64 of the right-eye R grating region, the right grating bulges 64 of the right-eye G grating region, the right grating bulges 64 of the right-eye B grating region are all bar-shaped grating bulges, and the right grating bulges 64 of the right-eye R grating region, the right grating bulges 64 of the right-eye G grating region, the right grating bulges 64 of the right-eye B grating region are all extending along the up and down direction in FIG. 2, and the right grating bulges 64 of the right-eye R grating region, the right grating bulges 64 of the right-eye G grating region, the right grating bulges 64 of the right-eye B grating region are all arranged in parallel along the left and right direction in FIG. 2.

In another way of arrangement of the right-eye pixels, the plurality of right-eye R pixels, the plurality of right-eye G pixels, the plurality of right-eye B pixels are arranged in the right display area 22 to form an array of right-eye pixels. Rows of pixels of the array of right-eye pixels extend along the direction parallel to the line between the center $a_L$ of the left-eye field-of-view central area $A_L$ and the center $a_R$ of the right-eye field-of-view central area $A_R$, and columns of pixels of the array of right-eye pixels extend along the direction perpendicular to the line between the center $a_L$ of the left-eye field-of-view central area $A_L$ and the center $a_R$ of the right-eye field-of-view central area $A_R$. Each Row of pixels of the array of right-eye pixels includes one type of the right-eye R pixels, the right-eye G pixels and the right-eye B pixels. Each column of pixels of the array of right-eye pixels includes a plurality of right-eye R pixels, a plurality of right-eye G pixels and a plurality of right-eye B pixels that are arranged alternately.

Specifically, the direction parallel to the line between the center $a_L$ of the left-eye field-of-view central area $A_L$ and the center $a_R$ of the right-eye field-of-view central area $A_R$ is the left and right direction in FIG. 2, and the direction perpendicular to the line between the center $a_L$ of the left-eye field-of-view central area $A_L$ and the center $a_R$ of the right-eye field-of-view central area $A_R$ is the up and down direction in FIG. 2. Rows of pixels of the array of right-eye pixels extend along the left and right direction in FIG. 2, and columns of pixels of the array of right-eye pixels extend along the up and down direction in FIG. 2. The array of right-eye pixels includes a plurality of rows of pixels and a plurality of columns of pixels, each row of pixels including only one type of right-eye R pixels, the right-eye G pixels and the right-eye B pixels, while each column of pixels including a plurality of right-eye R pixels, a plurality of right-eye G pixels and a plurality of right-eye B pixels that are arranged alternately. That is, the array of right-eye pixels include a plurality of rows of right-eye R pixels, a plurality of rows of right-eye G pixels and a plurality of rows of right-eye B pixels that are arranged alternately, the rows of right-eye R pixels consisting of a plurality of right-eye R pixels arranged along the left and right direction in FIG. 2, the rows of right-eye G pixels consisting of a plurality of right-eye G pixels arranged along the left and right direction in FIG. 2, and the rows of right-eye B pixels consisting of a plurality of right-eye B pixels arranged along the left and right direction in FIG. 2.

When the right-eye pixels in the right display area 22 are arranged in this way of arrangement of the right-eye pixels, and the grating layer 60 is arranged in the way for the grating layer 60 as shown in FIG. 5, the right grating region 62 of the grating layer 60 comprises a plurality of right grating bulges 64, which are bar-shaped grating bulges, the right grating bulges 64 extend along the left and right direction of FIG. 2, and the right grating bulges 64 are arranged in parallel along the up and down direction of FIG. 2. In this case, the right grating bulges 64 of the right-eye R grating region, the right grating bulges 64 of the right-eye G grating region, the right grating bulges 64 of the right-eye B grating region are all bar-shaped grating bulges, and the right grating bulges 64 of the right-eye R grating region, the right grating bulges 64 of the right-eye G grating region, the right grating bulges 64 of the right-eye B grating region are all extending along the left and right direction in FIG. 2, and the right grating bulges 64 of the right-eye R grating region, the right grating bulges 64 of the right-eye G grating region, the right grating bulges 64 of the right-eye B grating region are all arranged in parallel along the up and down direction in FIG. 2.

In yet another way of arrangement of the right-eye pixels, the plurality of right-eye R pixels, the plurality of right-eye G pixels, the plurality of right-eye B pixels are arranged in the right display area 22 to form an array of right-eye pixels. Rows of pixels of the array of right-eye pixels extend along the direction parallel to the line between the center $a_L$ of the left-eye field-of-view central area $A_L$ and the center $a_R$ of the right-eye field-of-view central area $A_R$, columns of pixels of the array of right-eye pixels extend along the direction perpendicular to the line between the center $a_L$ of the left-eye field-of-view central area $A_L$ and the center $a_R$ of the right-eye field-of-view central area $A_R$. Rows of pixels of the array of right-eye pixels include a plurality of right-eye R pixels, a plurality of right-eye G pixels and a plurality of right-eye B pixels that are arranged alternately. Columns of pixels of the array of right-eye pixels include a plurality of right-eye R pixels, a plurality of right-eye G pixels and a plurality of right-eye B pixels that are arranged alternately.

It shall be noted that in the above embodiment, when the right-eye R pixels, the right-eye G pixels, the right-eye B pixels are arranged alternately, the arrangement may be in the order of the right-eye R pixels, the right-eye G pixels, the right-eye B pixels, or the arrangement may be in the order of the right-eye R pixels, the right-eye B pixels, the right-eye G pixels, or the arrangement may be in the order of the right-eye G pixels, the right-eye R pixels, the right-eye B pixels. In practical applications, other alternating arrangements may be adopted, which are not limited herein.

In the above embodiment, when the viewer is viewing the image displayed by the display device 10, the image viewed by the viewer seems to be projected on the virtual screen 70 behind the display device 10. The positional relation among the viewer, the display device 10 and the virtual screen 70 vary.

Figure 6:
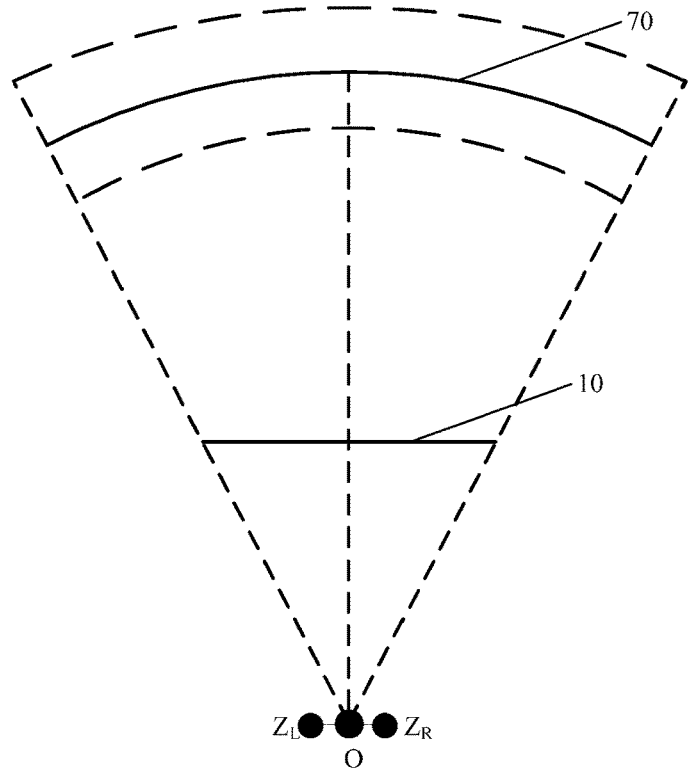
FIG. 6 shows a positional relationship among a viewer, a display device and a virtual screen.

In one positional relation among the viewer, the display device 10 and the virtual screen 70, referring to FIG. 6, the viewer is viewing the image displayed on the display device 10, the image is projected on the virtual screen 70 behind the display device 10, and the virtual screen 70 is a curved-surface virtual screen. The virtual screen 70 has a center of a circle, and a midpoint of the line between the left eye $Z_L$ and right eye $Z_R$ of the viewer is at the center of circle of the virtual screen 70.

Figure 7:
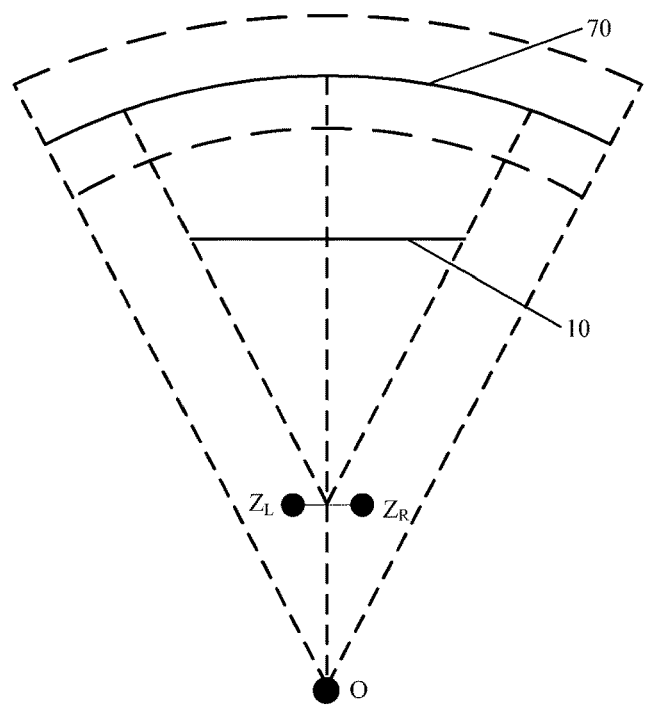
FIG. 7 shows another positional relationship among the viewer, the display device and the virtual screen.

In another positional relation among the viewer, the display device 10 and the virtual screen 70, referring to FIG. 7, the viewer is viewing the image displayed on the display device 10, the image is projected on the virtual screen 70 behind the display device 10, and the virtual screen 70 is a curved-surface virtual screen. The virtual screen 70 has a center of a circle, and a midpoint of the line between the left eye $Z_L$ and right eye $Z_R$ of the viewer is at a side of the center of circle of the virtual screen 70 close to the virtual screen 70.

Figure 8:
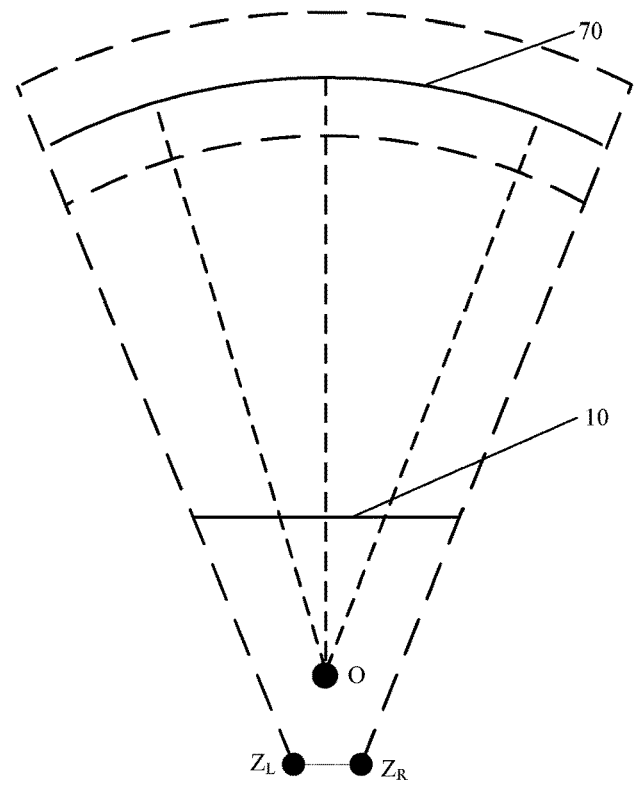
FIG. 8 shows still another positional relationship among the viewer, the display device and the virtual screen.

In yet another positional relation among the viewer, the display device 10 and the virtual screen 70, referring to FIG. 8, the viewer is viewing the images displayed on the display device 10, the image is projected on the virtual screen 70 behind the display device 10, the virtual screen 40 is a curved-surface virtual screen and has a center of circle. The display device 10 is at a side of the center of circle of the virtual screen 70 close to the virtual screen 70, and the midpoint of the line between the left eye $Z_L$ and right eye $Z_R$ of the viewer is at a side of the center of circle of the virtual screen 70 far away from the virtual screen 70.

It shall be noted that in the positional relation among the viewer, the display device 10 and the virtual screen 70 as shown in FIG. 6, when the distance between the viewer and the display device 10 is constant, with respect to display devices 10 of the same size, the grating periods of respective positions on the display device 10 may adopt the same preset value if the position of the left-eye field-of-view central area $A_L$ and the position of the right-eye field-of-view central area $A_R$ are the same. In the positional relation among the viewer, the display device 10 and the virtual screen 70 as shown in FIG. 7, when the distance between the viewer and the display device 10 is constant, with respect to display devices 10 of the same size, the grating periods of respective positions on the display device 10 may adopt the same preset value if the position of the left-eye field-of-view central area $A_L$ and the position of the right-eye field-of-view central area $A_R$ are the same. In the positional relation among the viewer, the display device 10 and the virtual screen 70 as shown in FIG. 8, when the distance between the viewer and the display device 10 is constant, with respect to display devices 10 of the same size, the grating periods of respective positions on the display device 10 may adopt the same preset value if the position of the left-eye field-of-view central area $A_L$ and the position of the right-eye field-of-view central area $A_R$ are the same.

It shall be noted that in practical applications, the arrangement of the grating layer 60, the ways of arrangement of the left-eye pixels, the ways of arrangement of the right-eye pixels and the positional relations among the viewer, the display device 10 and the virtual screen 70 can be combined freely to meet different application requirements for the display device 10, and realize different displays of the display device 10, for example, curved-surface 3D display, spherical 3D display, etc.

During practical application, light emitted from the left-eye field-of-view central area $A_L$ of the display device 10 can usually be directed to the left eye $Z_L$ of the viewer. Light emitted from the left-eye field-of-view central area $A_L$ of the display device 10 and falling into the left eye $Z_L$ of the viewer is usually the light of zero-order diffraction after passing through the grating layer 60. Light emitted from the non left-eye field-of-view central area of the display device 10 is deflected so as to be incident into the left eye $Z_L$ of the viewer. Light emitted from the non left-eye field-of-view central area of the display device 10 and falling into the left eye $Z_L$ of the viewer is usually the light of non-zero-order diffraction (e.g. first-order diffraction) after passing through the grating layer 60. Thus light emitted from the left-eye field-of-view central area $A_L$ of the display device 10 and falling into the left eye $Z_L$ of the viewer may have a higher intensity than light emitted from the non left-eye field-of-view central area of the display device 10 and falling into the left eye $Z_L$ of the viewer. Light emitted from the right-eye field-of-view central area $A_R$ of the display device 10 can be directed to the right eye $Z_R$ of the viewer. Light emitted from the right-eye field-of-view central area $A_R$ of the display device 10 and falling into the left eye $Z_R$ of the viewer is usually the light of zero-order diffraction after passing through the grating layer 60. Light emitted from the non right-eye field-of-view central area of the display device 10 is deflected so as to be incident into the right eye $Z_R$ of the viewer. Light emitted from the non right-eye field-of-view central area of the display device 10 and falling into the right eye $Z_R$ of the viewer is usually the light of non-zero-order diffraction (e.g. first-order diffraction) after passing through the grating layer 60. Thus light emitted from the right-eye field-of-view central area $A_R$ of the display device 10 and falling into the right eye $Z_R$ of the viewer may have a higher intensity than light emitted from the non right-eye field-of-view central area of the display device 10 and falling into the right eye $Z_R$ of the viewer.

In order to further improve the on-the-spot effect of the display of the display device 10 and the immersion of the viewer, so as to improve the viewing experience of the viewer to bring more real and comfortable viewing experience to the viewer, it is necessary to increase the intensity of the light emitted from the non left-eye field-of-view central area of the display device 10 and falling into the left eye $Z_L$ of the viewer, such that intensities of light emitted from respective positions on the display device 10 and falling into the left eye $Z_L$ of the viewer match. Likewise, it is necessary to increase the intensity of the light emitted from the non right-eye field-of-view central area of the display device 10 and falling into the right eye $Z_R$ of the viewer, such that intensities of light emitted from respective positions on the display device 10 and falling into the right eye $Z_R$ of the viewer match.

The display device 10 in the embodiment of the present disclosure is provided with the grating layer 60. The incident light incident on the grating layer 60 will be diffracted and interfered at the grating layer 60. The kth-order diffraction obtained by diffraction of the incident light at the grating layer 60 will have constructive interference or destructive interference, which is related to the thickness of the grating bulges of the grating layer 60. Thus by setting the thickness of the grating bulges of the grating layer 60, diffraction of a certain order may have constructive interference or destructive interference, thereby adjusting the intensity of the kth-order diffraction, and adjusting the intensity of light emitted from the respective positions on the display device 10 and falling into the left eye $Z_L$ of the viewer, such that the amount and intensity of light emitted from respective positions on the display device 10 and falling into the left eye $Z_L$ of the viewer match; and adjusting the intensity of light emitted from the respective positions on the display device 10 and falling into the right eye $Z_R$ of the viewer, such that the amount and intensity of light emitted from respective positions on the display device 10 and falling into the right eye $Z_R$ of the viewer match. As a result, the viewing experience of the viewer can be further improved to bring more real and comfortable viewing experience to the viewer.

Generally, when the grating period and the grating duty cycle of the grating layer 60 are fixed, refractive indexes of the grating bulges of the grating layer 60 are $n_G$, and a refractive index of a filler in a gap between two adjacent grating bulges is $n_S$, and the incident light incident on the grating layer 60 has a wavelength $\lambda$. When a thickness h of a grating bulge of the grating layer 60 is $$h = \frac{m\lambda}{|n_G - n_S|},$$

and when m is a half integer, the zero-order diffraction obtained by diffraction of the incident light at the grating layer 60 has a destructive interference, and the first-order diffraction obtained by diffraction of the incident light at the grating layer 60 has a constructive interference. When the thickness h of a grating bulge of the grating layer 60 is $$h = \frac{m\lambda}{|n_G - n_S|},$$

and when m is an integer, the zero-order diffraction obtained by diffraction of the incident light at the grating layer 60 has a constructive interference, and the first-order diffraction obtained by diffraction of the incident light at the grating layer 60 has a destructive interference.

Figure 9:
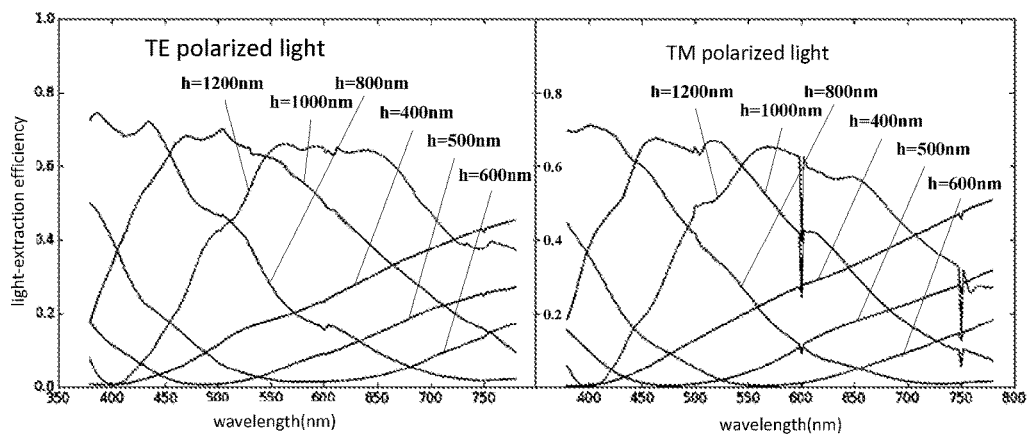
FIG. 9 shows a relationship between light-extraction efficiency of a zero-order diffraction and a thickness of a left grating bulge.
Figure 10:
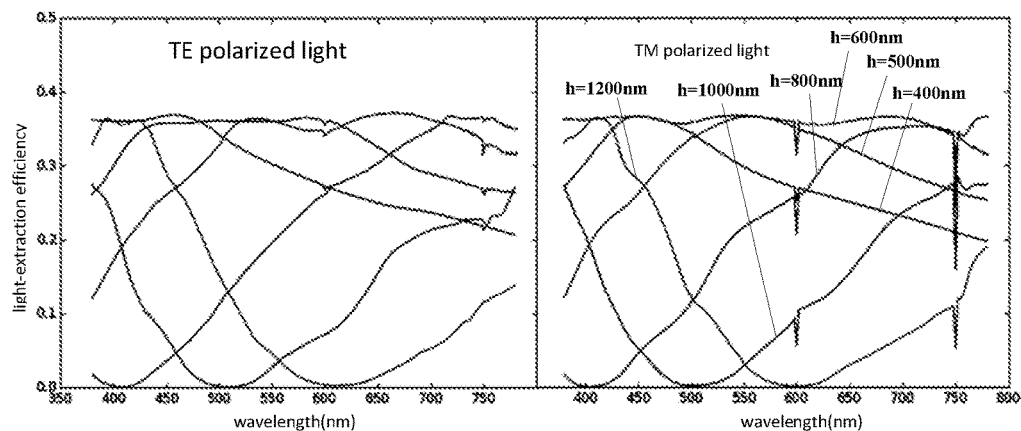
FIG. 10 shows a relationship between light-extraction efficiency of a first-order diffraction and a thickness of a left grating bulge.

For example, referring to FIGS. 9 and 10, when the grating period of the grating layer 60 is 3 μm, and the grating duty cycle of the grating layer 60 is 0.5, a relationship between the light-extraction efficiency of the zero-order diffraction obtained by diffraction, at the grating layer 60, of the incident light on the grating layer 60 and the thickness of a grating bulge of the grating layer 60 is as shown in FIG. 9, and a relationship between the light-extraction efficiency of the first-order diffraction obtained by diffraction, at the grating layer 60, of the incident light on the grating layer 60 and the thickness of a grating bulge of the grating layer 60 is as shown in FIG. 10. As shown by FIGS. 9 and 10, when m is an integer, e.g., when m is 1, the zero-order diffraction has constructive interference, and the first-order diffraction has destructive interference; when m is a half integer, e.g. when m is ½, the zero-order diffraction has destructive interference, and the first-order diffraction has constructive interference.

In other words, the intensities of light emitted from respective positions of the display device 10 and falling into the left eye $Z_L$ of the viewer are related to the thicknesses of the left grating bulges 63 of the left grating region; and the intensities of light emitted from respective positions of the display device 10 and falling into the right eye $Z_R$ of the viewer are related to the thicknesses of the right grating bulges 64 of the right grating region 62. According to this conclusion, by setting the thicknesses of the grating bulges on respective areas of the grating layer 60, the intensities of the zero-order diffraction and the non-zero-order diffraction on respective positions of the display device 10 can be adjusted, thus the intensity of the light emitted from respective positions on the display device 10 and falling into the left eye $Z_L$ of the viewer as well as the intensity of the light emitted from respective positions on the display device 10 and falling into the right eye $Z_R$ of the viewer can be adjusted. For example, the non-zero-order diffraction obtained by diffraction of the incident light in the area of the left grating region 61 corresponding to the non left-eye field-of-view central area is made to have a constructive interference, and the zero-order diffraction obtained by diffraction of the incident light in the area of the left grating region 61 corresponding to the left-eye field-of-view central area is made to have a destructive interference, so that intensities of light emitted from respective positions on the display device 10 and falling into the left eye $Z_L$ of the viewer match. Besides, the non-zero-order diffraction obtained by diffraction of the incident light in the area of the right grating region 62 corresponding to the non right-eye field-of-view central area is made to have a constructive interference, and the zero-order diffraction obtained by diffraction of the incident light in the area of the right grating region 62 corresponding to the right-eye field-of-view central area is made to have a destructive interference, so that intensities of light emitted from respective positions on the display device 10 and falling into the right eye $Z_R$ of the viewer match.

In the embodiment of the present disclosure, control to both the zero-order diffraction and the first-order diffraction obtained by diffraction of the incident light at the grating layer 60 is described as an example. For the viewer, the light emitted from the left-eye field-of-view central area $A_L$ of the display device 10 can be considered as being directed to the left eye $Z_L$ of the viewer, while the light emitted from the non left-eye field-of-view central area of the display device 10 needs to be deflected so as to fall into the sight of the left eye $Z_L$ of the viewer. Therefore, in the left-eye field-of-view central area $A_L$ of the display device 10, the zero-order diffraction obtained by diffraction of the incident light at the left grating region 61 is mainly controlled, while in the non left-eye field-of-view central area of the display device 10, the first-order diffraction obtained by diffraction of the incident light at the left grating region 61 is mainly controlled. For the viewer, the light emitted from the right-eye field-of-view central area $A_R$ of the display device 10 can be considered as being directed to the right eye $Z_R$ of the viewer, while the light emitted from the non right-eye field-of-view central area of the display device 10 needs to be deflected so as to fall into the sight of the right eye $Z_R$ of the viewer. Therefore, in the right-eye field-of-view central area $A_R$ of the display device 10, the zero-order diffraction obtained by diffraction of the incident light at the right grating region 62 is mainly controlled, while in the non right-eye field-of-view central area of the display device 10, the first-order diffraction obtained by diffraction of the incident light at the right grating region 62 is mainly controlled.

Specifically, it is generally assumed that the incident light incident on the grating layer 60 is perpendicular to the grating layer 60, i.e. the incident light incident on the grating layer 60 is in collimated incidence, and the incident angle $\theta_0$ of the incident light incident on the grating layer 60 is 0°. For example, when the display device 10 is a liquid crystal display device, the display device 10 comprises a display panel 20 and a back light source which provides area light source to the display panel 20. When an area light source is incident into the display panel 20, the incidence is usually perpendicular to the display panel 20, and when the grating layer 60 is arranged inside or outside of the display panel 20, the area light source is also incident perpendicular to the grating layer 60.

The left grating region 61 comprises a plurality of left grating bulges 63, wherein left grating bulges 63 corresponding to the left-eye field-of-view central area $A_L$ have a thickness $h_{AL}$ that satisfies the formula of:

$$h_{AL} = \frac{m_{AL}\lambda}{|n_{GAL} - n_{SAL}|} \qquad (2)$$

wherein, $n_{GAL}$ is a refractive index of the left grating bulges 63 corresponding to the left-eye field-of-view central area $A_L$, $n_{SAL}$ is a refractive index of a filler in a gap 65 between two adjacent left grating bulges 63 corresponding to the left-eye field-of-view central area $A_L$, $\lambda$ is a wavelength of incident light incident on the grating layer 60, $m_{AL}$ is a first constant, which satisfies: $i_{AL}-\frac{1}{2}<m_{AL}<i_{AL}+\frac{1}{2}$, $i_{AL}=1,2,3,4K$.

In formula (2), the first constant $m_{AL}$ satisfies $i_{AL}-\frac{1}{2}<m_{AL}<i_{AL}+\frac{1}{2}$, $i_{AL}=1,2,3,4K$, i.e. the first constant $m_{AL}$ is not a half integer. Then the first-order diffraction obtained by diffraction of the incident light in the area of the left grating region 61 corresponding to the left-eye field-of-view central area $A_L$ has a destructive interference, while the zero-order diffraction obtained by diffraction of the incident light in the area of the left grating region 61 corresponding to the left-eye field-of-view central area $A_L$ has no destructive interference. In other words, when the thickness $h_{AL}$ of the left grating bulges 63 in the area corresponding to the left-eye field-of-view central area $A_L$ satisfies formula (2), the intensity of light emitted from the left-eye field-of-view central area $A_L$ of the display device 10 and falling into the left eye $Z_L$ of the viewer can be adjusted by adjusting the intensity of light of the zero-order diffraction obtained by diffraction of the incident light in the left-eye R grating region corresponding to the left-eye field-of-view central area $A_L$, adjusting the intensity of light of the zero-order diffraction obtained by diffraction of the incident light in the left-eye G grating region corresponding to the left-eye field-of-view central area $A_L$, and adjusting the intensity of light of the zero-order diffraction obtained by diffraction of the incident light in the left-eye B grating region corresponding to the left-eye field-of-view central area $A_L$, thereby improving brightness uniformity of the image viewed by the viewer, and improving viewing experience of the viewer to bring more real and comfortable viewing experience to the viewer.

The value of the first constant $m_{AL}$ can be an integer or a non-integer. The value of the first constant $m_{AL}$ can be chosen according to the actual need. For example, when there is only a small difference between the intensity of the zero-order diffraction obtained by diffraction of the incident light in the area of the left grating region 61 corresponding to the left-eye field-of-view central area $A_L$ and the intensity of the first-order diffraction obtained by diffraction of the incident light in the area of the left grating region 61 corresponding to the non left-eye field-of-view central area, the first constant $m_{AL}$ can be an integer. The zero-order diffraction obtained by diffraction of the incident light in the area of the left grating region 61 corresponding to the left-eye field-of-view central area $A_L$ has a constructive interference, and the intensity of the light of the zero-order diffraction obtained by diffraction of the incident light in the area of the left grating region 61 corresponding to the left-eye field-of-view central area $A_L$ reaches the maximum at this time. Alternatively, the first constant $m_{AL}$ can be a non-integer, and the value thereof is close to an integer. For example, when $i_{AL}=1$ and $0.5<m_{AL}<1$, the value of the first constant $m_{AL}$ can be 0.85, 0.9 or 0.95, etc.; when $i_{AL}=1$ and $1<m_{AL}<1.5$, the value of the first constant $m_{AL}$ can be 1.05, 1.1 or 1.15, etc.

When there is a big difference between the intensity of the zero-order diffraction obtained by diffraction of the incident light in the area of the left grating region 61 corresponding to the left-eye field-of-view central area $A_L$ and the intensity of the first-order diffraction obtained by diffraction of the incident light in the area of the left grating region 61 corresponding to the non left-eye field-of-view central area, the value of the first constant $m_{AL}$ may not be an integer, and the value of the first constant $m_{AL}$ is optionally close to a half integer, i.e. the value of the first constant $m_{AL}$ satisfies: $i_{AL}-\frac{1}{2}<m_{AL}<i_{AL}$, $i_{AL}=1,2,3,4K$, or $i_{AL}<m_{AL}<i_{AL}+\frac{1}{2}$, $i_{AL}=1,2,3,4K$. For example, when $i_{AL}=1$ and $0.5<m_{AL}<1$, the value of the first constant $m_{AL}$ can be 0.55, 0.58 or 0.6, etc.; when $i_{AL}=1$ and $1<m_{AL}<1.5$, the value of the first constant $m_{AL}$ can be 1.4, 1.43 or 1.46, etc.

By setting the value of the first constant $m_{AL}$, the zero-order diffraction obtained by diffraction of the incident light in the area of the left grating region 61 corresponding to the left-eye field-of-view central area $A_L$ will not have complete constructive interference, so that the intensity of light emitted from the non left-eye field-of-view central area of the display device 10 and falling into the left eye $Z_L$ of the viewer matches the intensity of light emitted from the left-eye field-of-view central area $A_L$ of the display device 10 and falling into the left eye $Z_L$ of the viewer.

The left grating bulges 63 corresponding to the non left-eye field-of-view central area have a thickness $h_{BL}$ that satisfies the formula of:

$$h_{BL} = \frac{m_{BL}\lambda}{|n_{GBL} - n_{SBL}|} \quad (3)$$

wherein, $n_{GBL}$ is a refractive index of the left grating bulges 63 corresponding to the non left-eye field-of-view central area, $n_{SBL}$ is a refractive index of a filler in a gap 65 between two adjacent left grating bulges 63 corresponding to the non left-eye field-of-view central area, $\lambda$ is a wavelength of incident light incident on the grating layer 60, $m_{BL}$ is a second constant, which satisfies: $m_{BL}=i_{BL}+\frac{1}{2}$, $i_{BL}=0,1,2,3,4K$.

When the thickness $h_{BL}$ of the left grating bulges 31 in the area corresponding to the non left-eye field-of-view central area satisfies formula (3), the first-order diffraction obtained by diffraction of the incident light in the area of the left grating region 61 corresponding to the non left-eye field-of-view central area has a constructive interference, which increases the intensity of the first-order diffraction obtained by diffraction of the incident light in the left-eye R grating region corresponding to the non left-eye field-of-view central area, increases the intensity of the first-order diffraction obtained by diffraction of the incident light in the left-eye G grating region corresponding to the non left-eye field-of-view central area, and increases the intensity of the first-order diffraction obtained by diffraction of the incident light in the left-eye B grating region corresponding to the non left-eye field-of-view central area, thereby increasing the intensity of the first-order diffraction obtained by diffraction of the incident light in the area of the left grating region 61 corresponding to the non left-eye field-of-view central area, such that intensities of light emitted from respective positions on the display device 10 and falling into the left eye $Z_L$ of the viewer match, and brightness difference of the image viewed by the viewer is reduced, as a result, brightness uniformity of the image viewed by the viewer is improved and the viewing experience of the viewer is further improved to bring more real and comfortable viewing experience to the viewer.

The right grating region 62 includes a plurality of right grating bulges 64, and the right grating bulges 64 corresponding to the right-eye field-of-view central area $A_R$ have a thickness $h_{AR}$ that satisfies the formula of:

$$h_{AR} = \frac{m_{AR}\lambda}{|n_{GAR} - n_{SAR}|} \quad (4)$$

wherein, $n_{GAR}$ is a refractive index of the right grating bulges 64 corresponding to the right-eye field-of-view central area $A_R$, $n_{SAR}$ is a refractive index of a filler in a gap 65 between two adjacent right grating bulges 64 corresponding to the right-eye field-of-view central area $A_R$, $\lambda$ is a wavelength of incident light incident on the grating layer 60, $m_{AR}$ is a third constant, which satisfies: $i_{AR}-\frac{1}{2}<m_{AR}<i_{AR}+\frac{1}{2}$, $i_{AR}=1,2,3,4K$.

In formula (4), the third constant $m_{AR}$ satisfies $i_{AR}-\frac{1}{2}<m_{AR}<i_{AR}+\frac{1}{2}$, $i_{AR}=1,2,3,4K$, i.e. the first constant $m_{AR}$ is not a half integer. Then the first-order diffraction obtained by diffraction of the incident light in the area of the right grating region 62 corresponding to the right-eye field-of-view central area $A_R$ has a destructive interference, while the zero-order diffraction obtained by diffraction of the incident light in the area of the right grating region 62 corresponding to the right-eye field-of-view central area $A_R$ does not have a destructive interference. In other words, when the thickness $h_{AR}$ of the right grating bulges 64 in the area corresponding to the right-eye field-of-view central area $A_R$ satisfies formula (4), the intensity of light emitted from the right-eye field-of-view central area $A_R$ of the display device 10 and falling into the right eye $Z_R$ of the viewer can be adjusted by adjusting the intensity of light of the zero-order diffraction obtained by diffraction of the incident light in the right-eye R grating region corresponding to the right-eye field-of-view central area $A_R$, adjusting the intensity of light of the zero-order diffraction obtained by diffraction of the incident light in the right-eye G grating region corresponding to the right-eye field-of-view central area $A_R$, and adjusting the intensity of light of the zero-order diffraction obtained by diffraction of the incident light in the right-eye B grating region corresponding to the right-eye field-of-view central area $A_R$, thereby improving brightness uniformity of the image viewed by the viewer, and improving viewing experience of the viewer to bring more real and comfortable viewing experience to the viewer.

The value of the third constant $m_{AR}$ can be an integer or a non-integer. The value of the third constant $m_{AR}$ can be chosen according to the actual need. For example, when there is only a small difference between the intensity of the zero-order diffraction obtained by diffraction of the incident light in the area of the right grating region 62 corresponding to the right-eye field-of-view central area $A_R$ and the intensity of the first-order diffraction obtained by diffraction of the incident light in the area of the right grating region 62 corresponding to the non right-eye field-of-view central area, the third constant $m_{AR}$ can be an integer. The zero-order diffraction obtained by diffraction of the incident light in the area of the right grating region 62 corresponding to the right-eye field-of-view central area $A_R$ has a constructive interference, and the intensity of the light of the zero-order diffraction obtained by diffraction of the incident light in the area of the right grating region 62 corresponding to the right-eye field-of-view central area $A_R$ reaches the maximum at this time. Alternatively, the third constant $m_{AR}$ can be a non-integer, and the value thereof is close to an integer. For example, when $i_{AR}=1$ and $0.5<M_{AR}<1$, the value of the third constant $m_{AR}$ can be 0.85, 0.9 or 0.95, etc.; when $i_{AR}=1$ and $1<m<1.5$, the value of the third constant $m_{AR}$ can be 1.05, 1.1 or 1.15, etc.

When there is a big difference between the intensity of the zero-order diffraction obtained by diffraction of the incident light in the area of the right grating region 62 corresponding to the right-eye field-of-view central area $A_R$ and the intensity of the first-order diffraction obtained by diffraction of the incident light in the area of the right grating region 62 corresponding to the non right-eye field-of-view central area, the value of the third constant $m_{AR}$ may not be an integer, and the value of the third constant $m_{AR}$ is optionally close to a half integer, i.e. the value of the third constant $m_{AR}$ satisfies: $i_{AR}-\frac{1}{2}<m_{AR}<i_{AR}$, $i_{AR}=1,2,3,4K$, or $i_{AR}<m_{AR}<i_{AR}+\frac{1}{2}$, $i_{AR}=1,2,3,4K$. For example, when $i_{AR}=1$ and $0.5<m_{AR}<1$, the value of the third constant $m_{AR}$ can be 0.55, 0.58 or 0.6, etc.; when $i_{AR}=1$ and $1<m<1.5$, the value of the third constant $m_{AR}$ can be 1.4, 1.43 or 1.46, etc.

By setting the value of the third constant $m_{AR}$, the zero-order diffraction obtained by diffraction of the incident light in the area of the right grating region 62 corresponding to the right-eye field-of-view central area $A_R$ will not have complete constructive interference, so that the intensity of light emitted from the non right-eye field-of-view central area of the display device 10 and falling into the right eye $Z_R$ of the viewer matches the intensity of light emitted from the right-eye field-of-view central area $A_R$ of the display device 10 and falling into the right eye $Z_R$ of the viewer.

The right grating bulges 64 corresponding to the non right-eye field-of-view central area have a thickness $h_{BR}$ that satisfies the formula of:

$$h_{BR} = \frac{m_{BR}\lambda}{|n_{GBR} - n_{SBR}|} \quad (5)$$

wherein, $n_{GBR}$ is a refractive index of the right grating bulges 64 corresponding to the non right-eye field-of-view central area, $n_{SBR}$ is a refractive index of a filler in a gap 65 between two adjacent right grating bulges 64 corresponding to the non right-eye field-of-view central area, $\lambda$ is a wavelength of incident light incident on the grating layer 60, $m_{BR}$ is a fourth constant, which satisfies: $m_{BR}=i_{BR}+\frac{1}{2}$, $i_{BR}=0,1,2,3,4K$.

When the thickness $h_{BR}$ of the right grating bulges 64 in the area corresponding to the non right-eye field-of-view central area satisfies formula (5), the first-order diffraction obtained by diffraction of the incident light in the area of the right grating region 62 corresponding to the non right-eye field-of-view central area has a constructive interference, which increases the intensity of the first-order diffraction obtained by diffraction of the incident light in the right-eye R grating region corresponding to the non right-eye field-of-view central area, increases the intensity of the first-order diffraction obtained by diffraction of the incident light in the right-eye G grating region corresponding to the non right-eye field-of-view central area, and increases the intensity of the first-order diffraction obtained by diffraction of the incident light in the right-eye B grating region corresponding to the non right-eye field-of-view central area, thereby increasing the intensity of the first-order diffraction obtained by diffraction of the incident light in the area of the right grating region 62 corresponding to the non right-eye field-of-view central area, such that intensities of light emitted from respective positions on the display device 10 and falling into the right eye $Z_R$ of the viewer match, and brightness difference of the image viewed by the viewer is reduced, as a result, brightness uniformity of the image viewed by the viewer is improved and the viewing experience of the viewer is further improved to bring more real and comfortable viewing experience to the viewer.

In the above embodiment, the left grating region 61 of the grating layer 60 comprises the left-eye R grating region corresponding to the left-eye R pixels, the left-eye G grating region corresponding to the left-eye G pixels, and the left-eye B grating region corresponding to the left-eye B pixels. The right grating region 62 of the grating layer 60 comprises the right-eye R grating region corresponding to the right-eye R pixels, the right-eye G grating region corresponding to the right-eye G pixels, and the right-eye B grating region corresponding to the right-eye B pixels.

When the thickness of the left grating bulges 63 in the area of the left-eye R grating region corresponding to the left-eye field-of-view central area $A_L$ is set, the thickness of the left grating bulges 63 in the area of the left-eye R grating region corresponding to the non left-eye field-of-view central area is set, the thickness of the right grating bulges 64 in the area of the right-eye R grating region corresponding to the right-eye field-of-view central area $A_R$ is set, and the thickness of the right grating bulges 64 in the area of the right-eye R grating region corresponding to the non right-eye field-of-view central area is set, the wavelength $\lambda$ of the incident light incident on the grating layer 60 is the wavelength of red light, which is 630 nm.

When the thickness of the left grating bulges 63 in the area of the left-eye G grating region corresponding to the left-eye field-of-view central area $A_L$ is set, the thickness of the left grating bulges 63 in the area of the left-eye G grating region corresponding to the non left-eye field-of-view central area is set, the thickness of the right grating bulges 64 in the area of the right-eye G grating region corresponding to the right-eye field-of-view central area $A_R$ is set, and the thickness of the right grating bulges 64 in the area of the right-eye G grating region corresponding to the non right-eye field-of-view central area is set, the wavelength $\lambda$ of the incident light incident on the grating layer 60 is the wavelength of green light, which is 550 nm.

When the thickness of the left grating bulges 63 in the area of the left-eye B grating region corresponding to the left-eye field-of-view central area $A_L$ is set, the thickness of the left grating bulges 63 in the area of the left-eye B grating region corresponding to the non left-eye field-of-view central area is set, the thickness of the right grating bulges 64 in the area of the right-eye B grating region corresponding to the right-eye field-of-view central area $A_R$ is set, and the thickness of the right grating bulges 64 in the area of the right-eye B grating region corresponding to the non right-eye field-of-view central area is set, the wavelength $\lambda$ of the incident light incident on the grating layer 60 is the wavelength of blue light, which is 430 nm.

In the above embodiment, there is a difference between $n_{GAL}$ and $n_{SAL}$, and the values of $n_{GAL}$ and $n_{SAL}$ can be set according to the actual application. For example, the relationship between $n_{GAL}$ and $n_{SAL}$ can be $n_{GAL}<n_{SAL}$ or $n_{GAL}>n_{SAL}$. In the embodiment of the present disclosure, the relationship between $n_{GAL}$ and $n_{SAL}$ is $n_{GAL}>n_{SAL}$, for example, $n_{GAL}=1.5$, $n_{SAL}=1$. That is, the material forming the grating bulges 63 in the area corresponding to the left-eye field-of-view central area $A_L$ has a refractive index of 1.5, and the filler filled in the gap 65 between two adjacent left grating bulges 63 in the area corresponding to the left-eye field-of-view central area $A_L$ has a refractive index of 1. When the grating layer 60 is external to the display panel 20, the filler between two adjacent left grating bulges 63 in the area corresponding to the left-eye field-of-view central area $A_L$ can be air.

In the above embodiment, there is a difference between $n_{GBL}$ and $n_{SBL}$, and the values of $n_{GBL}$ and $n_{SBL}$ can be set according to the actual application. For example, the relationship between $n_{GBL}$ and $n_{SBL}$ can be $n_{GBL}<n_{SBL}$ or $n_{GBL}>n_{SBL}$. In the embodiment of the present disclosure, the relationship between $n_{GBL}$ and $n_{SBL}$ is $n_{GBL}>n_{SBL}$, for example, $n_{GBL}=1.5$, $n_{SBL}=1$. That is, the material forming the left grating bulges 63 in the area corresponding to the non left-eye field-of-view central area has a refractive index of 1.5, and the filler filled in the gap 65 between two adjacent left grating bulges 63 in the area corresponding to the non left-eye field-of-view central area has a refractive index of 1.

When the grating layer 60 is external to the display panel 20, the filler between two adjacent left grating bulges 63 in the area corresponding to the non left-eye field-of-view central area can be air.

In the above embodiment, there is a difference between $n_{GAR}$ and $n_{SAR}$, and the values of $n_{GAR}$ and $n_{SAR}$ can be set according to the actual application. For example, the relationship between $n_{GAR}$ and $n_{SAR}$ can be $n_{GAR}<n_{SAR}$ or $n_{GAR}>n_{SAR}$. In the embodiment of the present disclosure, the relationship between $n_{GAR}$ and $n_{SAR}$ is $n_{GAR}>n_{SAR}$, for example, $n_{GAR}=1.5$, $n_{SAR}=1$. That is, the material forming the right grating bulges 64 in the area corresponding to the right-eye field-of-view central area $A_R$ has a refractive index of 1.5, and the filler filled in the gap 65 between two adjacent right grating bulges 64 in the area corresponding to the right-eye field-of-view central area $A_R$ has a refractive index of 1. When the grating layer 60 is external to the display panel 20, the filler between two adjacent right grating bulges 64 in the area corresponding to the right-eye field-of-view central area $A_R$ can be air.

In the above embodiment, there is a difference between $n_{GBR}$ and $n_{SBR}$, and the values of $n_{GBR}$ and $n_{SBR}$ can be set according to the actual application. For example, the relationship between $n_{GBR}$ and $n_{SBR}$ can be $n_{GBR}<n_{SBR}$ or $n_{GBR}>n_{SBR}$. In the embodiment of the present disclosure, the relationship between $n_{GBR}$ and $n_{SBR}$ is $n_{GBR}>n_{SBR}$, for example, $n_{GBR}=1.5$, $n_{SBR}=1$. That is, the material forming the right grating bulges 64 in the area corresponding to the non right-eye field-of-view central area has a refractive index of 1.5, and the filler filled in the gap 65 between two adjacent right grating bulges 64 in the area corresponding to the non right-eye field-of-view central area has a refractive index of 1. When the grating layer 60 is external to the display panel 20, the filler between two adjacent right grating bulges 64 in the area corresponding to the non right-eye field-of-view central area can be air.

In formula (2), when the values of $n_{GAL}$, $n_{SAL}$ and $\lambda$ are determined, the larger the value of the first constant $m_{AL}$, the larger the thickness $h_{AL}$ of the left grating bulges 63 in the area corresponding to the left-eye field-of-view central area $A_L$. When making thick left grating bulges 63, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the first constant $m_{AL}$ satisfies $0.5<m_{AL}<1.5$, and optionally satisfies $0.5<m_{AL}\leq 1$ so as to reduce the thickness $h_{AL}$ of the left grating bulges 63 in the area corresponding to the left-eye field-of-view central area $A_L$, thereby reducing the manufacturing cost of the display device 10 and facilitating a thin design of the display device 10.

In formula (3), when the values of $n_{GBL}$, $n_{SBL}$ and $\lambda$ are determined, the larger the value of the second constant $m_{BL}$, the larger the thickness $h_{BL}$ of the left grating bulges 63 in the area corresponding to the non left-eye field-of-view central area. When making thick left grating bulges 63, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the second constant $m_{BL}$ satisfies $m_{BL}=0.5$, so as to reduce the thickness $h_{BL}$ of the left grating bulges 63 in the area corresponding to the non left-eye field-of-view central area, thereby reducing the manufacturing cost of the display device 10 and facilitating a thin design of the display device 10.

In formula (4), when the values of $n_{GAR}$, $n_{SAR}$ and $\lambda$ are determined, the larger the value of the third constant $m_{AR}$, the larger the thickness $h_{AR}$ of the right grating bulges 64 in the area corresponding to the right-eye field-of-view central area $A_R$. When making thick right grating bulges 64, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the third constant $m_{AR}$ satisfies $0.5<m_{AR}<1.5$, and optionally satisfies $0.5<m_{AR}\leq 1$ so as to reduce the thickness $h_{AR}$ of the right grating bulges 64 in the area corresponding to the right-eye field-of-view central area $A_R$, thereby reducing the manufacturing cost of the display device 10 and facilitating a thin design of the display device 10.

In formula (5), when the values of $n_{GBR}$, $n_{SBR}$ and $\lambda$ are determined, the larger the value of the fourth constant $m_{BR}$, the larger the thickness $h_{BR}$ of the right grating bulges 64 in the area corresponding to the non right-eye field-of-view central area. When making thick right grating bulges 64, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the fourth constant $m_{BR}$ satisfies $m_{BR}=0.5$, so as to reduce the thickness $h_{BR}$ of the right grating bulges 64 in the area corresponding to the non right-eye field-of-view central area, thereby reducing the manufacturing cost of the display device 10 and facilitating a thin design of the display device 10.

When setting the thickness of the left grating bulges 63 in the area of the left-eye R grating region corresponding to the left-eye field-of-view central area $A_L$, the wavelength $\lambda$ of the light incident on the grating layer 60 is the wavelength of red light, which is 630 nm. According to formula (2), when the first constant $m_{AL}$ satisfies $0.5<m_{AL}<1.5$, the thickness $h_{ALR}$ of the left grating bulges 63 in the area of the left-eye R grating region corresponding to the left-eye field-of-view central area $A_L$ satisfies 315 nm$<h_{ALR}<$945 nm. In practical application, when a difference between the intensity of the zero-order diffraction obtained by diffraction of the incident light in the area of the left-eye R grating region corresponding to the left-eye field-of-view central area $A_L$ and the intensity of the first-order diffraction obtained by diffraction of the incident light in the area of the left-eye R grating region corresponding to the non left-eye field-of-view central area is small, the thickness $h_{ALR}$ of the left grating bulges 63 in the area of the left-eye R grating region corresponding to the left-eye field-of-view central area $A_L$ can be 630 nm. Alternatively, the thickness $h_{ALR}$ of the left grating bulges 63 in the area of the left-eye R grating region corresponding to the left-eye field-of-view central area $A_L$ can have a value close to 630 nm, for example, the thickness $h_{ALR}$ of the left grating bulges 63 in the area of the left-eye R grating region corresponding to the left-eye field-of-view central area $A_L$ can be 550 nm, 580 nm, 600 nm, 650 nm or 680 nm, etc. When a difference between the intensity of the zero-order diffraction obtained by diffraction of the incident light in the area of the left-eye R grating region corresponding to the left-eye field-of-view central area $A_L$ and the intensity of the first-order diffraction obtained by diffraction of the incident light in the area of the left-eye R grating region corresponding to the non left-eye field-of-view central area is big, optionally, the thickness $h_{ALR}$ of the left grating bulges 63 in the area of the left-eye R grating region corresponding to the left-eye field-of-view central area $A_L$ is close to 315 nm. For example, the thickness $h_{ALR}$ of the left grating bulges 63 in the area of the left-eye R grating region corresponding to the left-eye field-of-view central area $A_L$ can be 330 nm, 370 nm or 400 nm, etc. Alternatively, the thickness $h_{ALR}$ of the left grating bulges 63 in the area of the left-eye R grating region corresponding to the left-eye field-of-view central area $A_L$ can be close to 945 nm, for example, the thickness $h_{ALR}$ of the left grating bulges 63 in the area of the left-eye R grating region corresponding to the left-eye field-of-view central area $A_L$ can be 850 nm, 900 nm or 930 nm, etc.

When setting the thickness of the left grating bulges 63 in the area of the left-eye G grating region corresponding to the left-eye field-of-view central area $A_L$, the wavelength λ of the light incident on the grating layer 60 is the wavelength of green light, which is 550 nm. According to formula (2), when the first constant $m_{AL}$ satisfies $0.5<m_{AL}<1.5$, the thickness $h_{ALG}$ of the left grating bulges 63 in the area of the left-eye G grating region corresponding to the left-eye field-of-view central area $A_L$ satisfies 275 nm$<h_{ALG}<$825 nm. In practical application, when a difference between the intensity of the zero-order diffraction obtained by diffraction of the incident light in the area of the left-eye G grating region corresponding to the left-eye field-of-view central area $A_L$ and the intensity of the first-order diffraction obtained by diffraction of the incident light in the area of the left-eye G grating region corresponding to the non left-eye field-of-view central area is small, the thickness $h_{ALG}$ of the left grating bulges 63 in the area of the left-eye G grating region corresponding to the left-eye field-of-view central area $A_L$ can be 550 nm. Alternatively, the thickness $h_{ALG}$ of the left grating bulges 63 in the area of the left-eye G grating region corresponding to the left-eye field-of-view central area $A_L$ can have a value close to 550 nm, for example, the thickness $h_{ALG}$ of the left grating bulges 63 in the area of the left-eye G grating region corresponding to the left-eye field-of-view central area $A_L$ can be 500 nm, 530 nm, 580 nm or 600 nm, etc.

When setting the thickness of the left grating bulges 63 in the area of the left-eye B grating region corresponding to the left-eye field-of-view central area $A_L$, the wavelength λ of the light incident on the grating layer 60 is the wavelength of blue light, which is 430 nm. According to formula (2), when the first constant $m_{AL}$ satisfies $0.5<m_{AL}<1.5$, the thickness $h_{ALB}$ of the left grating bulges 63 in the area of the left-eye B grating region corresponding to the left-eye field-of-view central area $A_L$ satisfies 215 nm$<h_{ALB}<$645 nm. In practical application, when a difference between the intensity of the zero-order diffraction obtained by diffraction of the incident light in the area of the left-eye B grating region corresponding to the left-eye field-of-view central area $A_L$ and the intensity of the first-order diffraction obtained by diffraction of the incident light in the area of the left-eye B grating region corresponding to the non left-eye field-of-view central area is small, the thickness $h_{ALB}$ of the left grating bulges 63 in the area of the left-eye B grating region corresponding to the left-eye field-of-view central area $A_L$ can be 430 nm. Alternatively, the thickness $h_{ALB}$ of the left grating bulges 63 in the area of the left-eye B grating region corresponding to the left-eye field-of-view central area $A_L$ can have a value close to 430 nm, for example, the thickness $h_{ALB}$ of the left grating bulges 63 in the area of the left-eye B grating region corresponding to the left-eye field-of-view central area $A_L$ can be 350 nm, 380 nm, 480 nm or 500 nm, etc. When a difference between the intensity of the zero-order diffraction obtained by diffraction of the incident light in the area of the left-eye B grating region corresponding to the left-eye field-of-view central area $A_L$ and the intensity of the first-order diffraction obtained by diffraction of the incident light in the area of the left-eye B grating region corresponding to the non left-eye field-of-view central area is big, optionally, the thickness $h_{ALB}$ of the left grating bulges 63 in the area of the left-eye B grating region corresponding to the left-eye field-of-view central area $A_L$ is close to 215 nm. For example, the thickness $h_{ALB}$ of the left grating bulges 63 in the area of the left-eye B grating region corresponding to the left-eye field-of-view central area $A_L$ can be 250 nm, 280 nm or 300 nm, etc. Alternatively, the thickness $h_{ALB}$ of the left grating bulges 63 in the area of the left-eye B grating region corresponding to the left-eye field-of-view central area $A_L$ is close to 645 nm, for example, the thickness $h_{ALB}$ of the left grating bulges 63 in the area of the left-eye B grating region corresponding to the left-eye field-of-view central area $A_L$ can be 620 nm, 600 nm or 550 nm, etc.

When setting the thickness of the left grating bulges 63 in the area of the left-eye R grating region corresponding to the non left-eye field-of-view central area, the wavelength λ of the light incident on the grating layer 60 is the wavelength of red light, which is 630 nm. According to formula (3), when the second constant $m_{BL}$ is 0.5, the thickness $h_{BLR}$ of the left grating bulges 63 in the area of the left-eye R grating region corresponding to the non left-eye field-of-view central area is 630 nm. When setting the thickness of the left grating bulges 63 in the area of the left-eye G grating region corresponding to the non left-eye field-of-view central area, the wavelength λ of the light incident on the grating layer 60 is the wavelength of green light, which is 550 nm. According to formula (3), when the second constant $m_{BL}$ is 0.5, the thickness $h_{BLG}$ of the left grating bulges 63 in the area of the left-eye G grating region corresponding to the non left-eye field-of-view central area is 630 nm. When setting the thickness of the left grating bulges 63 in the area of the left-eye B grating region corresponding to the non left-eye field-of-view central area, the wavelength λ of the light incident on the grating layer 60 is the wavelength of blue light, which is 430 nm. According to formula (3), when the second constant $m_{BL}$ is 0.5, the thickness $h_{BLB}$ of the left grating bulges 63 in the area of the left-eye B grating region corresponding to the non left-eye field-of-view central area is 430 nm.

When setting the thickness of the right grating bulges 64 in the area of the right-eye R grating region corresponding to the right-eye field-of-view central area $A_R$, the wavelength λ of the light incident on the grating layer 60 is the wavelength of red light, which is 630 nm. According to formula (4), when the third constant $m_{AR}$ satisfies $0.5<m_{AR}<1.5$, the thickness $h_{ARR}$ of the right grating bulges 64 in the area of the right-eye R grating region corresponding to the right-eye field-of-view central area $A_R$ satisfies 315 nm$<h_{ARR}<$945 nm. In practical application, when a difference between the intensity of the zero-order diffraction obtained by diffraction of the incident light in the area of the right-eye R grating region corresponding to the right-eye field-of-view central area $A_R$ and the intensity of the first-order diffraction obtained by diffraction of the incident light in the area of the right-eye R grating region corresponding to the non right-eye field-of-view central area is small, the thickness $h_{ARR}$ of the right grating bulges 64 in the area of the right-eye R grating region corresponding to the right-eye field-of-view central area $A_R$ can be 630 nm. Alternatively, the thickness $h_{ARR}$ of the right grating bulges 64 in the area of the right-eye R grating region corresponding to the right-eye field-of-view central area $A_R$ can have a value close to 630 nm, for example, the thickness $h_{ARR}$ of the right grating bulges 64 in the area of the right-eye R grating region corresponding to the right-eye field-of-view central area $A_R$ can be 550 nm, 580 nm, 600 nm, 650 nm or 680 nm, etc. When a difference between the intensity of the zero-order diffraction obtained by diffraction of the incident light in the area of the right-eye R grating region corresponding to the right-eye field-of-view central area $A_R$ and the intensity of the first-order diffraction obtained by diffraction of the incident light in the area of the right-eye R grating region corresponding to the non right-eye field-of-view central area is big, optionally, the thickness $h_{ARR}$ of the right grating bulges 64 in the area of the right-eye R grating region corresponding to the right-eye field-of-view central area $A_R$ is close to 315 nm. For example, the thickness $h_{ARR}$ of the right grating bulges 64 in the area of the right-eye R grating region corresponding to the right-eye field-of-view central area $A_R$ can be 330 nm, 370 nm or 400 nm, etc. Alternatively, the thickness $h_{ARR}$ of the right grating bulges 64 in the area of the right-eye R grating region corresponding to the right-eye field-of-view central area $A_R$ can be close to 945 nm, for example, the thickness $h_{ARR}$ of the right grating bulges 64 in the area of the right-eye G grating region corresponding to the right-eye field-of-view central area $A_R$ can be 850 nm, 900 nm or 930 nm, etc.

When setting the thickness of the right grating bulges 64 in the area of the right-eye G grating region corresponding to the right-eye field-of-view central area $A_R$, the wavelength λ of the light incident on the grating layer 60 is the wavelength of green light, which is 550 nm. According to formula (4), when the third constant $m_{AR}$ satisfies $0.5<m_{AR}<1.5$, the thickness $h_{ARG}$ of the right grating bulges 64 in the area of the right-eye G grating region corresponding to the right-eye field-of-view central area $A_R$ satisfies 275 nm$<h_{ARG}<$825 nm. In practical application, when a difference between the intensity of the zero-order diffraction obtained by diffraction of the incident light in the area of the right-eye G grating region corresponding to the right-eye field-of-view central area $A_R$ and the intensity of the first-order diffraction obtained by diffraction of the incident light in the area of the right-eye G grating region corresponding to the non right-eye field-of-view central area is small, the thickness $h_{ARG}$ of the right grating bulges 64 in the area of the right-eye G grating region corresponding to the right-eye field-of-view central area $A_R$ can be 550 nm. Alternatively, the thickness $h_{ARG}$ of the right grating bulges 64 in the area of the right-eye G grating region corresponding to the right-eye field-of-view central area $A_R$ can have a value close to 550 nm, for example, the thickness $h_{ARG}$ of the right grating bulges 64 in the area of the right-eye G grating region corresponding to the right-eye field-of-view central area $A_R$ can be 500 nm, 530 nm, 580 nm or 600 nm, etc. When a difference between the intensity of the zero-order diffraction obtained by diffraction of the incident light in the area of the right-eye G grating region corresponding to the right-eye field-of-view central area $A_R$ and the intensity of the first-order diffraction obtained by diffraction of the incident light in the area of the right-eye G grating region corresponding to the non right-eye field-of-view central area is big, optionally, the thickness $h_{ARG}$ of the right grating bulges 64 in the area of the right-eye G grating region corresponding to the right-eye field-of-view central area $A_R$ is close to 275 nm. For example, the thickness $h_{ARG}$ of the right grating bulges 64 in the area of the right-eye B grating region corresponding to the right-eye field-of-view central area $A_R$ can be 300 nm, 320 nm or 350 nm, etc. Alternatively, the thickness $h_{ARG}$ of the right grating bulges 64 in the area of the right-eye G grating region corresponding to the right-eye field-of-view central area $A_R$ is close to 825 nm, for example, the thickness $h_{ARG}$ of the right grating bulges 64 in the area of the right-eye G grating region corresponding to the right-eye field-of-view central area $A_R$ can be 800 nm, 760 nm or 730 nm, etc.

When setting the thickness of the right grating bulges 64 in the area of the right-eye B grating region corresponding to the right-eye field-of-view central area $A_R$, the wavelength λ of the light incident on the grating layer 60 is the wavelength of blue light, which is 430 nm. According to formula (4), when the third constant $m_{AR}$ satisfies $0.5<m_{AR}<1.5$, the thickness $h_{ARB}$ of the right grating bulges 64 in the area of the right-eye B grating region corresponding to the right-eye field-of-view central area $A_R$ satisfies 215 nm$<h_{ARB}<$645 nm. In practical application, when a difference between the intensity of the zero-order diffraction obtained by diffraction of the incident light in the area of the right-eye B grating region corresponding to the right-eye field-of-view central area $A_R$ and the intensity of the first-order diffraction obtained by diffraction of the incident light in the area of the right-eye B grating region corresponding to the non right-eye field-of-view central area is small, the thickness $h_{ARB}$ of the right grating bulges 64 in the area of the right-eye B grating region corresponding to the right-eye field-of-view central area $A_R$ can be 430 nm. Alternatively, the thickness $h_{ARB}$ of the right grating bulges 64 in the area of the right-eye B grating region corresponding to the right-eye field-of-view central area $A_R$ can have a value close to 430 nm, for example, the thickness $h_{ARB}$ of the right grating bulges 64 in the area of the right-eye B grating region corresponding to the right-eye field-of-view central area $A_R$ can be 350 nm, 380 nm, 480 nm or 500 nm, etc. When a difference between the intensity of the zero-order diffraction obtained by diffraction of the incident light in the area of the right-eye B grating region corresponding to the right-eye field-of-view central area $A_R$ and the intensity of the first-order diffraction obtained by diffraction of the incident light in the area of the right-eye B grating region corresponding to the non right-eye field-of-view central area is big, optionally, the thickness $h_{ARB}$ of the right grating bulges 64 in the area of the right-eye B grating region corresponding to the right-eye field-of-view central area $A_R$ is close to 215 nm. For example, the thickness $h_{ARB}$ of the right grating bulges 64 in the area of the right-eye B grating region corresponding to the right-eye field-of-view central area $A_R$ can be 250 nm, 280 nm or 300 nm, etc. Alternatively, the thickness $h_{ARB}$ of the right grating bulges 64 in the area of the right-eye B grating region corresponding to the right-eye field-of-view central area $A_R$ is close to 645 nm, for example, the thickness $h_{ARB}$ of the right grating bulges 64 in the area of the right-eye B grating region corresponding to the right-eye field-of-view central area $A_R$ can be 620 nm, 600 nm or 550 nm, etc.

When setting the thickness of the right grating bulges 64 in the area of the right-eye R grating region corresponding to the non right-eye field-of-view central area, the wavelength λ of the light incident on the grating layer 60 is the wavelength of red light, which is 630 nm. According to formula (5), when the fourth constant $m_{BR}$ is 0.5, the thickness $h_{BRR}$ of the right grating bulges 64 in the area of the right-eye R grating region corresponding to the non right-eye field-of-view central area is 630. When setting the thickness of the right grating bulges 64 in the area of the right-eye G grating region corresponding to the non right-eye field-of-view central area, the wavelength λ of the light incident on the grating layer 60 is the wavelength of green light, which is 550 nm. According to formula (5), when the fourth constant $m_{BR}$ is 0.5, the thickness $h_{BRG}$ of the right grating bulges 64 in the area of the right-eye G grating region corresponding to the non right-eye field-of-view central area is 630 nm. When setting the thickness of the right grating bulges 64 in the area of the right-eye B grating region corresponding to the non right-eye field-of-view central area, the wavelength λ of the light incident on the grating layer 60 is the wavelength of blue light, which is 430 nm. According to formula (5), when the fourth constant $m_{BR}$ is 0.5, the thickness $h_{BRB}$ of the right grating bulges 64 in the area of the right-eye B grating region corresponding to the non right-eye field-of-view central area is 430 nm.

Figure 11:
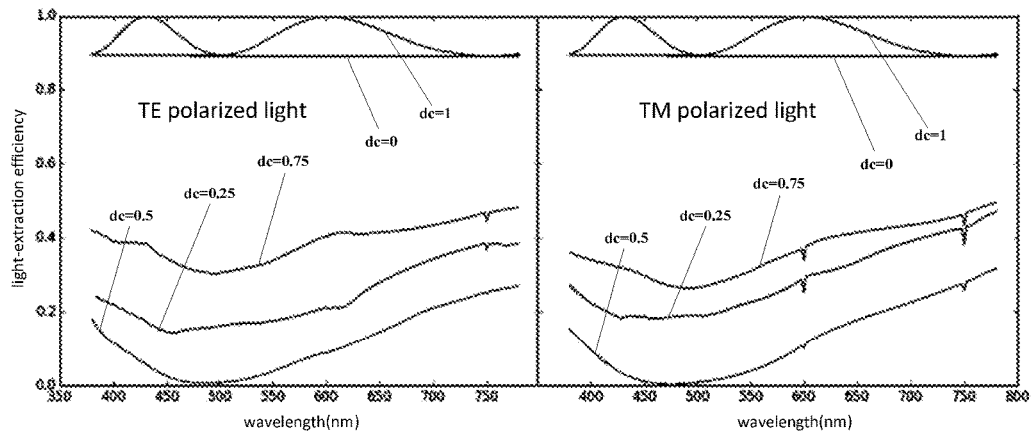
FIG. 11 shows a relationship between light-extraction efficiency of a zero-order diffraction and a grating duty cycle.
Figure 12:
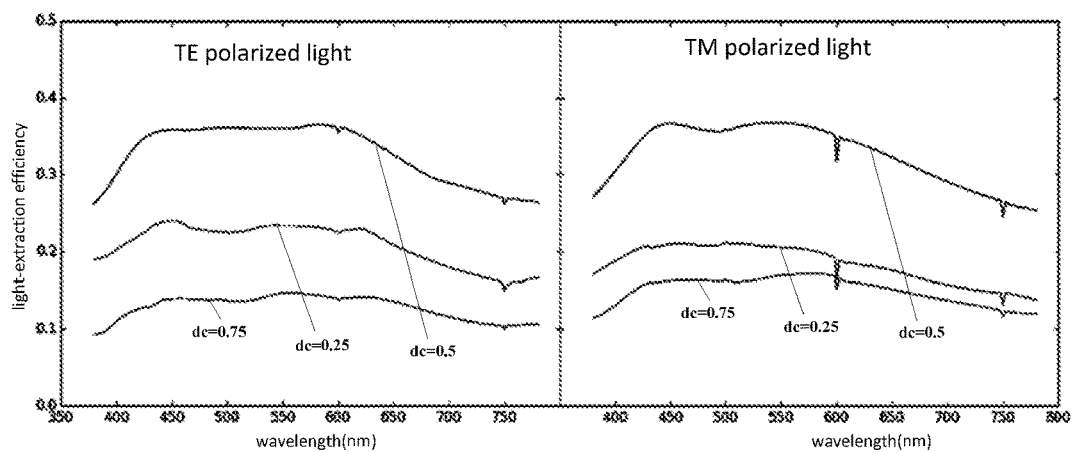
FIG. 12 shows a relationship between light-extraction efficiency of a first-order diffraction and a grating duty cycle.

In practical application, referring to FIGS. 11 and 12, when the grating period of the grating layer 60 is 3 μm and the thickness of the grating bulges of the grating layer 60 is 500 nm, a relationship between the light-extraction efficiency of the zero-order diffraction obtained by the incident light incident on the grating layer 60 being diffracted at the grating layer 60 and the grating duty cycle is as shown in FIG. 11, and a relationship between the light-extraction efficiency of the first-order diffraction obtained by the incident light incident on the grating layer 60 being diffracted at the grating layer 60 and the grating duty cycle is as shown in FIG. 12. It can be seen from FIG. 11 that, as for the zero-order diffraction, when the grating duty cycle is 0.5, the zero-order diffraction has the smallest intensity, and when the grating duty cycle is smaller than 0.5, the intensity of the zero-order diffraction decreases as the grating duty cycle increases, and when the grating duty cycle is greater than 0.5, the intensity of the zero-order diffraction increases as the grating duty cycle increases. It can be seen from FIG. 12 that as for the first-order diffraction, when the grating duty cycle is 0.5, the first-order diffraction has the largest intensity, and when the grating duty cycle is smaller than 0.5, the intensity of the first-order diffraction increases as the grating duty cycle increases, and when the grating duty cycle is greater than 0.5, the intensity of the first-order diffraction decreases as the grating duty cycle increases.

In other words, the intensities of light emitted from respective positions on the display device 10 are also related to the grating duty cycle of the grating layer 60. According to this conclusion, by setting the grating duty cycle of the left grating region 61, the intensity of the non-zero-order diffraction obtained by diffraction of the incident light in the area of the left grating region 61 corresponding to the non left-eye field-of-view central area can be increased, and accordingly, the intensity of the light emitted from the non left-eye field-of-view central area of the display device 10 and falling into the left eye $Z_L$ of the viewer can be increased, and when necessary, the intensity of the zero-order diffraction obtained by diffraction of the incident light in the area of the left grating region 61 corresponding to the left-eye field-of-view central area $A_L$ can be decreased properly, so as to reduce the intensity of the light emitted from the left-eye field-of-view central area $A_L$ of the display device 10 and falling into the left eye $Z_L$ of the viewer properly, as a result, the intensity of light emitted from the non left-eye field-of-view central area of the display device 10 and falling into the left eye $Z_L$ of the viewer is made to match the intensity of light emitted from the left-eye field-of-view central area $A_L$ of the display device 10 and falling into the left eye $Z_L$ of the viewer.

By setting the grating duty cycle of the right grating region 62, the intensity of the non-zero-order diffraction obtained by diffraction of the incident light in the area of the right grating region 62 corresponding to the non right-eye field-of-view central area can be increased, and accordingly, the intensity of the light emitted from the non right-eye field-of-view central area of the display device 10 and falling into the right eye $Z_R$ of the viewer can be increased, and when necessary, the intensity of the zero-order diffraction obtained by diffraction of the incident light in the area of the right grating region 62 corresponding to the right-eye field-of-view central area $A_R$ can be decreased properly, so as to reduce the intensity of the light emitted from the right-eye field-of-view central area $A_R$ of the display device 10 and falling into the right eye $Z_R$ of the viewer properly, as a result, the intensity of light emitted from the non right-eye field-of-view central area of the display device 10 and falling into the right eye $Z_R$ of the viewer is made to match the intensity of light emitted from the right-eye field-of-view central area $A_R$ of the display device 10 and falling into the right eye $Z_R$ of the viewer.

Specifically, in the area corresponding to the left-eye field-of-view central area $A_L$, the grating duty cycle $dc_{AL}$ of the left grating region 61 satisfies $0.2 \leq dc_{AL} \leq 0.8$; in the area corresponding to the non left-eye field-of-view central area, the grating duty cycle $dc_{BL}$ of the left grating region 61 is 0.5. In the area corresponding to the right-eye field-of-view central area $A_R$, the grating duty cycle $dc_{AR}$ of the right grating region 62 satisfies $0.2 \leq dc_{AR} \leq 0.8$; in the area corresponding to the non right-eye field-of-view central area, the grating duty cycle $dc_{BR}$ of the right grating region 62 is 0.5.

In an embodiment of the present disclosure, in the area of the left grating region 61 corresponding to the non left-eye field-of-view central area, the grating duty cycle $dc_{BL}$ of the left grating region 61 is set as 0.5. Thus in the area corresponding to the non left-eye field-of-view central area, when the grating period of the left grating region 61 and the thickness of the left grating bulges 63 in the left grating region 61 are fixed, the first-order diffraction obtained by diffraction of the incident light in the area of the left grating region 61 corresponding to the non left-eye field-of-view central area has the largest intensity, so that light emitted from the non left-eye field-of-view central area of the display device 10 and falling into the left eye $Z_L$ of the viewer has a stronger intensity, as a result, the intensity of light emitted from the non left-eye field-of-view central area of the display device 10 and falling into the left eye $Z_L$ of the viewer matches the intensity of light emitted from the left-eye field-of-view central area $A_L$ of the display device 10 and falling into the left eye $Z_L$ of the viewer.

In an embodiment of the present disclosure, in the area corresponding to the left-eye field-of-view central area $A_L$, the grating duty cycle $dc_{AL}$ of the left grating region 61 satisfies $0.2 \leq dc_{AL} \leq 0.8$. In practical application, in the area corresponding to the left-eye field-of-view central area $A_L$, the value of the grating duty cycle $dc_{AL}$ of the left grating region 61 can be set according to the actual need. For example, when there is a big difference between the intensity of light emitted from the non left-eye field-of-view central area of the display device 10 and falling into the left eye $Z_L$ of the viewer and the intensity of light emitted from the left-eye field-of-view central area $A_L$ of the display device 10 and falling into the left eye $Z_L$ of the viewer, the value of the grating duty cycle $dc_{AL}$ of the left grating region 61 can be set as 0.5 in the area corresponding to the left-eye field-of-view central area $A_L$. In this case, in the area corresponding to the left-eye field-of-view central area $A_L$, when the grating period of the left grating region 61 and the thickness of the left grating bulges 63 in the left grating region 61 are fixed, the zero-order diffraction obtained by diffraction of the incident light in the area of the left grating region 61 corresponding to the left-eye field-of-view central area $A_L$ has the smallest intensity, so that the intensity of the zero-order diffraction obtained by diffraction of the incident light in the area of the left grating region 61 corresponding to the left-eye field-of-view central area $A_L$ can be decreased properly, as a result, the intensity of light emitted from the non left-eye field-of-view central area of the display device 10 and falling into the left eye $Z_L$ of the viewer matches the intensity of light emitted from the left-eye field-of-view central area $A_L$ of the display device 10 and falling into the left eye $Z_L$ of the viewer. When there is a small difference between the intensity of light emitted from the non left-eye field-of-view central area of the display device 10 and falling into the left eye $Z_L$ of the viewer and the intensity of light emitted from the left-eye field-of-view central area $A_L$ of the display device 10 and falling into the left eye $Z_L$ of the viewer, the grating duty cycle $dc_{AL}$ of the left grating region 61 can be made to satisfy $0.2 \leq dc_{AL} < 0.5$ or $0.5 < dc_{AL} \leq 0.8$ in the area corresponding to the left-eye field-of-view central area $A_L$. For example, the value of the grating duty cycle $dc_{AL}$ of the left grating region 61 can be 0.2, 0.3, 0.4, 0.6, 0.7 or 0.8. In this case, in the area corresponding to the left-eye field-of-view central area $A_L$, when the grating period of the left grating region 61 and the thickness of the left grating bulges 63 in the left grating region 61 are fixed, the intensity of the zero-order diffraction obtained by diffraction of the incident light in the area of the left grating region 61 corresponding to the left-eye field-of-view central area $A_L$ is not the smallest, and the intensity of the zero-order diffraction obtained by diffraction of the incident light in the area of the left grating region 61 corresponding to the left-eye field-of-view central area $A_L$ is not the strongest, either, such that the intensity of light emitted from the non left-eye field-of-view central area of the display 10 and falling into the left eye $Z_L$ of the viewer matches the intensity of light emitted from the left-eye field-of-view central area $A_L$ of the display device 10 and falling into the left eye $Z_L$ of the viewer.

In an embodiment of the present disclosure, in the area of the right grating region 62 corresponding to the non right-eye field-of-view central area, the grating duty cycle $dc_{BR}$ of the right grating region 62 is set as 0.5, thus in the area corresponding to the non right-eye field-of-view central area, when the grating period of the right grating region 62 and the thickness of the right grating bulges 64 in the right grating region 62 are fixed, the first-order diffraction obtained by diffraction of the incident light in the area of the right grating region 62 corresponding to the non right-eye field-of-view central area has the largest intensity, so that light emitted from the non right-eye field-of-view central area of the display device 10 and falling into the right eye $Z_R$ of the viewer has a stronger intensity, as a result, the intensity of light emitted from the non right-eye field-of-view central area of the display device 10 and falling into the right eye $Z_R$ of the viewer matches the intensity of light emitted from the right-eye field-of-view central area $A_R$ of the display device 10 and falling into the right eye $Z_R$ of the viewer.

In an embodiment of the present disclosure, in the area corresponding to the right-eye field-of-view central area $A_R$, the grating duty cycle $dc_{AR}$ of the right grating region 62 satisfies $0.2 \leq dc_{AR} \leq 0.8$. In practical application, in the area corresponding to the right-eye field-of-view central area $A_R$, the value of the grating duty cycle $dc_{AR}$ of the right grating region 62 can be set according to the actual need. For example, when there is a big difference between the intensity of light emitted from the non right-eye field-of-view central area of the display device 10 and falling into the right eye $Z_R$ of the viewer and the intensity of light emitted from the right-eye field-of-view central area $A_R$ of the display device 10 and falling into the right eye $Z_R$ of the viewer, the value of the grating duty cycle $dc_{AR}$ of the right grating region 62 can be set as 0.5 in the area corresponding to the right-eye field-of-view central area $A_R$. In this case, in the area corresponding to the right-eye field-of-view central area $A_R$, when the grating period of the right grating region 62 and the thickness of the right grating bulges 64 in the right grating region 62 are fixed, the zero-order diffraction obtained by diffraction of the incident light in the area of the right grating region 62 corresponding to the right-eye field-of-view central area $A_R$ has the smallest intensity, so that the intensity of the zero-order diffraction obtained by diffraction of the incident light in the area of the right grating region 62 corresponding to the right-eye field-of-view central area $A_R$ can be decreased properly, as a result, the intensity of light emitted from the non right-eye field-of-view central area of the display device 10 and falling into the right eye $Z_R$ of the viewer matches the intensity of light emitted from the right-eye field-of-view central area $A_R$ of the display device 10 and falling into the right eye $Z_R$ of the viewer. When there is a small difference the intensity of light emitted from the non right-eye field-of-view central area of the display device 10 and falling into the right eye $Z_R$ of the viewer and the intensity of light emitted from the right-eye field-of-view central area $A_R$ of the display device 10 and falling into the right eye $Z_R$ of the viewer, the grating duty cycle $dc_{AR}$ of the right grating region 62 can be made to satisfy $0.2 \leq dc_{AR} < 0.5$ or $0.5 < dc_{AR} \leq 0.8$ in the area corresponding to the right-eye field-of-view central area $A_R$. For example, the value of the grating duty cycle $dc_{AR}$ of the right grating region 62 can be 0.2, 0.3, 0.4, 0.6, 0.7 or 0.8. In this case, in the area corresponding to the right-eye field-of-view central area $A_R$, when the grating period of the right grating region 62 and the thickness of the right grating bulges 64 in the right grating region 62 are fixed, the intensity of the zero-order diffraction obtained by diffraction of the incident light in the area of the right grating region 62 corresponding to the right-eye field-of-view central area $A_R$ is not the smallest, and the intensity of the zero-order diffraction obtained by diffraction of the incident light in the area of the right grating region 62 corresponding to the right-eye field-of-view central area $A_R$ is not the strongest, either, such that the intensity of light emitted from the non right-eye field-of-view central area of the display 10 and falling into the right eye $Z_R$ of the viewer matches the intensity of light emitted from the right-eye field-of-view central area $A_R$ of the display device 10 and falling into the right eye $Z_R$ of the viewer.

In the above embodiments, the left grating bulges 63 can be either transparent grating bulges or non-transparent grating bulges, and there are many options for the materials of the left grating bulges 63. In an embodiment of the present disclosure, the left grating bulges 63 are transparent grating bulges and are polymethyl methacrylate grating bulges.

In the above embodiments, the right grating bulges 64 can be either transparent grating bulges or non-transparent grating bulges, and there are many options for the materials of the right grating bulges 64. In an embodiment of the present disclosure, the right grating bulges 64 are transparent grating bulges and are polymethyl methacrylate grating bulges.

Referring to FIGS. 13-18, the section shape of a left grating bulge 63 can be a step shape, a trapezoidal shape, or a triangular shape, and the section shape of a right grating bulge 64 can be a step shape, a trapezoidal shape, or a triangular shape.

Figure 13:
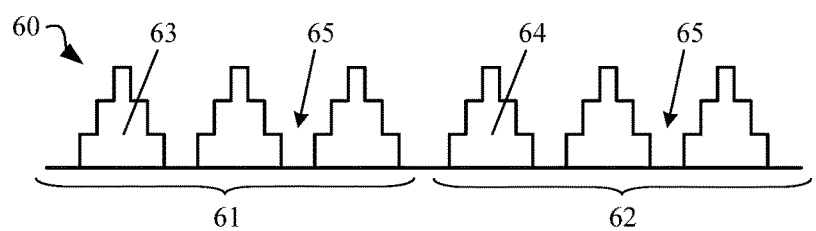
FIG. 13 is a sectional view of a grating layer.
Figure 14:
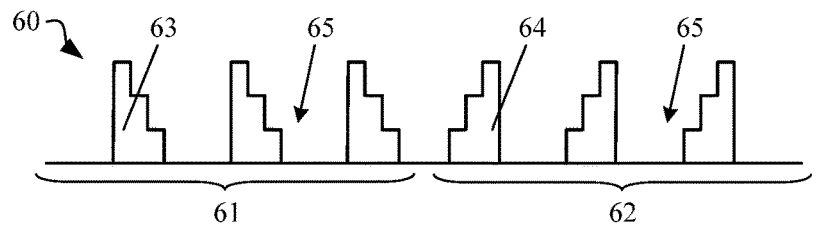
FIG. 14 is another sectional view of the grating layer.

For example, referring to FIGS. 13-14, the left grating region 61 comprises a plurality of left grating bulges 63, and there is a gap 65 between two adjacent left grating bulges 63, and when a left grating bulge 63 is cut by a plane perpendicular to a direction of extension of the gap 65 between two adjacent left grating bulges 63, the obtained section shape of the left grating bulge 63 is a step shape. In practical application, as shown in FIG. 14, one of the sides of the section of the left grating bulge 63 can have a step shape, or as shown in FIG. 13, both of the sides of the section of the left grating bulge 63 have a step shape. When both of the sides of the section of the left grating bulge 63 have a step shape, the step shapes of both sides of the section of the left grating bulge 63 can be symmetrical relative to a central line perpendicular to a light entrance surface of the left grating bulge 63 in the section of the left grating bulge 63, or the step shapes of both sides of the section of the left grating bulge 63 can be asymmetrical relative to the central line perpendicular to the light entrance surface of the left grating bulge 63 in the section of the left grating bulge 63. Correspondingly, the right grating bulges 64 can be arranged in the same way as the left grating bulges 63 as described above, which will not be elaborated any more.

Figure 15:
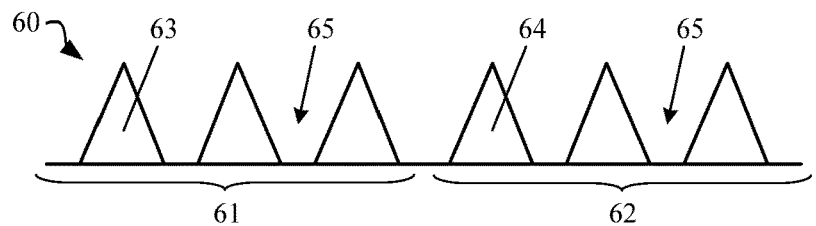
FIG. 15 is still another sectional view of the grating layer.
Figure 16:
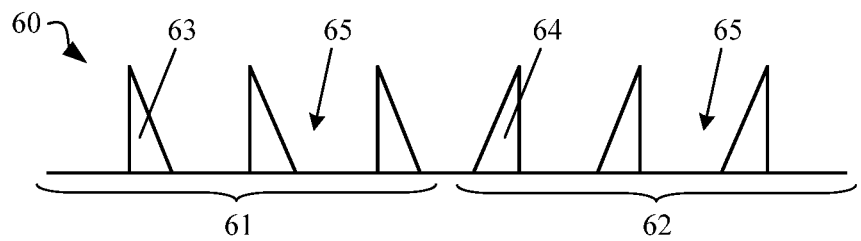
FIG. 16 is a sectional view of the grating layer.

Referring to FIGS. 15 and 16, the left grating region 61 comprises a plurality of left grating bulges 63, and there is a gap 65 between two adjacent left grating bulges 63, and when a left grating bulge 63 is cut by a plane perpendicular to a direction of extension of the gap 65 between two adjacent left grating bulges 63, the obtained section shape of the left grating bulge 63 is a triangular shape. In practical application, as shown in FIG. 15, both of the sides of the section of the left grating bulge 63 can be symmetrical relative to a central line perpendicular to a light entrance surface of the left grating bulge 63 in the section of the left grating bulge 63. Then the section shape of the left grating bulge 63 is an isosceles triangle. Alternatively, as shown in FIG. 16, both of the sides of the section of the left grating bulge 63 can be asymmetrical relative to the central line perpendicular to the light entrance surface of the left grating bulges 63 in the section of the left grating bulge 63. Correspondingly, the right grating bulges 64 can be arranged in the same way as the left grating bulges 63 as described above, which will not be elaborated any more.

Figure 17:
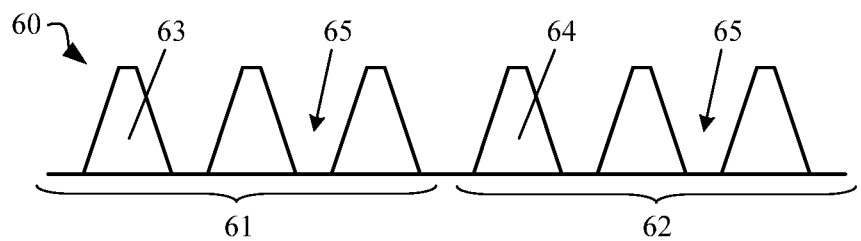
FIG. 17 is another sectional view of the grating layer.
Figure 18:
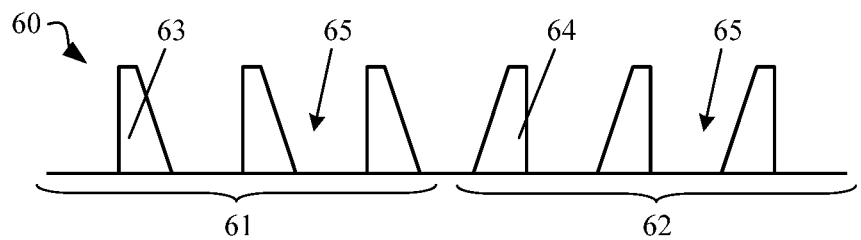
FIG. 18 is still another sectional view of the grating layer.

Referring to FIGS. 17 and 18, the left grating region 61 comprises a plurality of left grating bulges 63, and there is a gap 65 between two adjacent left grating bulges 63. When a left grating bulge 63 is cut by a plane perpendicular to a direction of extension of the gap 65 between two adjacent left grating bulges 63, the obtained section shape of the left grating bulge 63 is a trapezoidal shape. In practical application, as shown in FIG. 17, both of the sides of the section of the left grating bulge 63 can be symmetrical relative to a central line perpendicular to a light entrance surface of the left grating bulge 63 in the section of the left grating bulge 63. Then the section shape of the left grating bulge 63 is an isosceles trapezoid. Alternatively, as shown in FIG. 18, both of the sides of the section of the left grating bulge 63 can be asymmetrical relative to the central line perpendicular to the light entrance surface of the left grating bulge 63 in the section of the left grating bulge 63. Correspondingly, the right grating bulges 64 can be arranged in the same way as the left grating bulges 63 as described above, which will not be elaborated any more.

Since the section shape of each left grating bulge 63 can be a step shape, a trapezoidal shape, or a triangular shape, a light emergent surface of each left grating bulge 63 is not parallel to the light entrance surface thereof. When light incident on the grating layer 60 passes through the left grating region 61, it is diffracted and interfered several times by the left grating region 61, thus the effects of diffraction and interference of the incident light in the left grating region 61 are enhanced, and the ability of adjusting the light emergent directions in respective positions on the left display area 21 is enhanced. As a result, light propagation in the area of the display device 10 corresponding to the left display area 21 can be better controlled and the effect of control to light propagation in the area of the display device 10 corresponding to the left display area 21 can be improved, thereby improving the viewing experience of the viewer to bring more real and comfortable viewing experience to the viewer.

Since the section shape of each right grating bulge 64 can be a step shape, a trapezoidal shape, or a triangular shape, a light emergent surface of each right grating bulge 64 is not parallel to the light entrance surface thereof. When light incident on the grating layer 60 passes through the right grating region 62, it is diffracted and interfered several times by the right grating region 62, thus the effects of diffraction and interference of the incident light in the right grating region 62 are enhanced, and the ability of adjusting the light emergent directions in respective positions on the right display area 22 is enhanced. As a result, light propagation in the area of the display device 10 corresponding to the right display area 22 can be better controlled and the effect of control to light propagation in the area of the display device 10 corresponding to the right display area 22 can be improved, thereby improving the viewing experience of the viewer to bring more real and comfortable viewing experience to the viewer.

It shall be noted that when both sides of the section of a left grating bulge 63 are asymmetrical relative to the central line of the section of the left grating bulge 63, and when light incident on the grating layer 60 passes through the left grating region 61, the incident light is diffracted and interfered in the left grating region 61, and the diffraction angle and intensity of the obtained kth-order diffraction are asymmetrical relative to the zero-order diffraction. By making both sides of the section of the left grating bulge 63 to be asymmetrical relative to the central line of the section of the left grating bulge 63, the kth-order diffraction emitted back to the sight of the viewer is enabled to have a destructive interference, while the kth-order diffraction emitted towards the sight of the viewer is enabled to have a constructive interference, thereby further improving the effect of control to the light propagation within the display device 10, improving viewing experience of the viewer to bring more real and comfortable viewing experience to the viewer.

When both sides of the section of a right grating bulge 64 are asymmetrical relative to the central line of the section of the right grating bulge 64, and when light incident on the grating layer 60 passes through the right grating region 62, the incident light is diffracted and interfered in the right grating region 62, and the diffraction angle and intensity of the obtained kth-order diffraction are asymmetrical relative to the zero-order diffraction. By making both sides of the section of the right grating bulge 64 to be asymmetrical relative to the central line of the section of the right grating bulge 64, the kth-order diffraction emitted back to the sight of the viewer is enabled to have a destructive interference, while the kth-order diffraction emitted towards the sight of the viewer is enabled to have a constructive interference, thereby further improving the effect of control to the light propagation within the display device 10, improving viewing experience of the viewer to bring more real and comfortable viewing experience to the viewer.

Still referring to FIG. 3, when the display device 10 is a liquid crystal display device, the display panel 20 comprises a color film layer 23, and the grating layer 60 is at a light emergent side or a light entrance side of the color film layer 23. For example, the display panel 20 comprises a first substrate, a second substrate and the color film layer 23, the first substrate and the second substrate being opposite to each other, the color film layer 23 being disposed between the first substrate and the second substrate, and a side of the color film layer 23 facing the second substrate is a light emergent side thereof. Alternatively, the grating layer 60 can be at a light emergent side of the color film layer 23, for example, the grating layer 60 can be between the color film layer 23 and the second substrate. Alternatively, the grating layer 60 can be disposed on a side of the second substrate facing away from the color film layer. Alternatively, the grating layer 60 can be on a light entrance side of the color film layer 23, for example, the grating layer 60 can be disposed between the color film layer 23 and the first substrate, or the grating layer 60 can be disposed on a side of the first substrate facing away from the color film layer 23.

In an embodiment of the present disclosure, the grating layer 60 is at the light emergent side of the color film layer 23 and contacts the color film layer 23. Specifically, the display panel 20 comprises the first substrate, the second substrate and the color film layer 23, the first substrate and the second substrate being opposite to each other, the color film layer 23 being disposed between the first substrate and the second substrate, and the side of the color film layer 23 facing the second substrate is the light emergent side thereof. The grating layer 60 is disposed between the color film layer 23 and the second substrate, and the grating layer 60 contacts the color film layer 23. In such a design, light incident on the grating layer 60 is light emergent from the color film layer 23, and since the grating layer 60 contacts the color film layer 23, emergent light from the color film layer 23 will not have a light mixing before being incident on the grating layer 60, thus the effect of control of the light propagation in the display device 10 by the grating layer 60 will not be reduced because of light mixing of the emergent light from the color film layer 23.

In the above embodiment, the grating layer 60 can be arranged external to the display panel 20. For example, the display device 10 is a liquid crystal display device, which comprises a back light source and the display panel 20 at a light emergent side of the back light source. The back light source provides an area light source for the display panel 20. The grating layer 60 can be arranged between the back light source and the display panel 20 and in contact with the back light source, and the area light source provided by the back light source is incident into the display panel 20 after passing through the grating layer 60.

When manufacturing the display device 10 provided in the above embodiments, the grating layer 60 can be prepared by various methods, for example, the grating layer 60 can be prepared by nanoimprint process or laser interference process.

Still referring to FIG. 1, the display device 10 further comprises a light barrier 50 at a light emergent side of the display device 10. The light barrier 50 is between the left display area 21 and the right display area 22. Specifically, referring to FIG. 1, the light emergent side of the display device 10 is the lower side in FIG. 1 and the light emergent surface of the display device 10 is the lower surface of the display panel 20 in FIG. 1. Along the left and right direction in FIG. 1, the light barrier 50 is provided in the middle of the display panel 20. The light barrier 50 can be a light-absorbing light barrier, i.e. the light barrier 50 can absorb light incident thereon. The light barrier 50 separates the left display area 21 and the right display area 22 of the display panel 20 as shown in FIG. 1. When a viewer is viewing an image displayed by the display device 10, light emitted from respective positions on the left display area 21 cannot enter the right eye $Z_R$ of the viewer due to the blocking of the light barrier 50, and light emitted from respective positions on the right display area 22 cannot enter the left eye $Z_L$ of the viewer due to the blocking of the light barrier 50, thus preventing the image viewed by the right eye $Z_R$ of the viewer from being interfered by the light emitted from respective positions on the left display area 21 and preventing the image viewed by the left eye $Z_L$ of the viewer from being interfered by the light emitted from respective positions on the right display area 22. Accordingly, crosstalk between images viewed by the left eye $Z_L$ and the right eye $Z_R$ of the viewer can be effectively reduced.

When the display device 10 provided in the above embodiment is applied to a near eye display device, for example, when the display device 10 is applied to a helmet display device or a glass-type display device, the light barrier 50 can be arranged on a housing of the helmet display device or glass-type display device. When a viewer is wearing the helmet display device or the glass-type display device, the light barrier 50 is between the left eye $Z_L$ and the right eye $Z_R$ of the viewer, and it can be held on the bridge of the nose of the viewer.

In the above embodiment, the display device 10 comprises the display panel 20 which comprises the left display area 21 corresponding to the left eye $Z_L$ of the viewer and the right display area 22 corresponding to the right eye $Z_R$ of the viewer. In practical application, the display device 10 may comprise two display panels which are respectively corresponding to the left eye $Z_L$ and the right eye $Z_R$ of the viewer.

Figure 19:
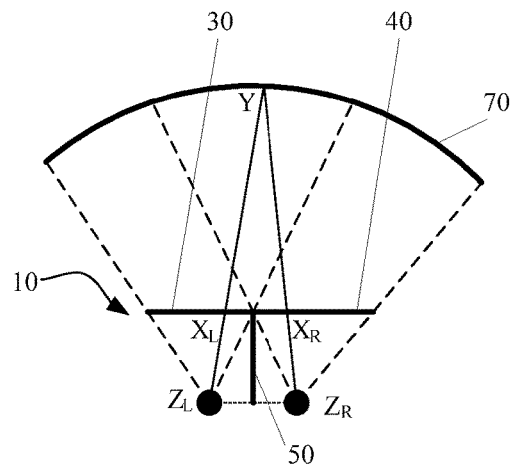
FIG. 19 is another structural diagram of the display device provided in the embodiment of the present disclosure.
Figure 20:
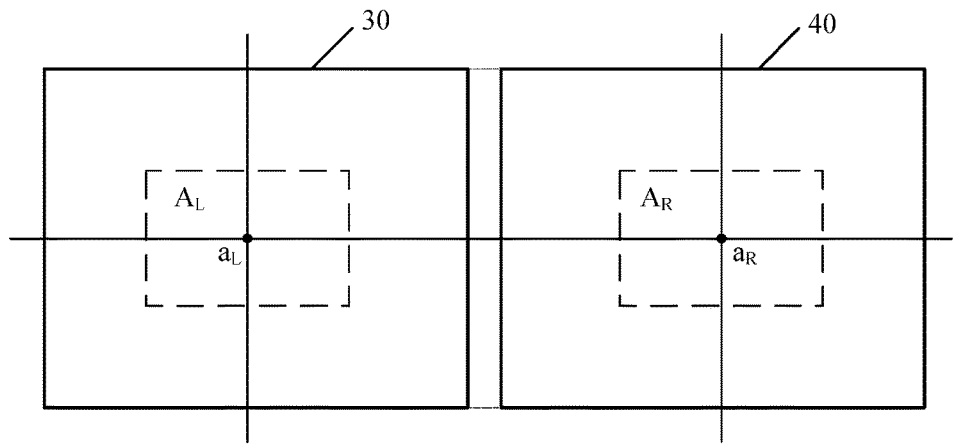
FIG. 20 is a plane view of the display device as shown in FIG. 19.

Specifically, referring to FIGS. 19 and 20, an embodiment of the present disclosure provides another display device 10. The display device 10 comprises a left display panel 30, a right display panel 40, a left grating layer arranged inside or outside of the left display panel 30, and a right grating layer arranged inside or outside of the right display panel 40. The left display panel 30 corresponds to a left eye $Z_L$ of a viewer, a left-eye field-of-view central area $A_L$ and a non left-eye field-of-view central area are in the left display panel 30, and the left-eye field-of-view central area $A_L$ and the non left-eye field-of-view central area together cover a light emergent surface of the left display panel 30. The left display panel 30 comprises a plurality of left-eye R pixels, a plurality of left-eye G pixels and a plurality of left-eye B pixels. The right display panel 40 corresponds to a right eye $Z_R$ of the viewer, a right-eye field-of-view central area $A_R$ and a non right-eye field-of-view central area are in the right display panel 40, and the right-eye field-of-view central area $A_R$ and the non right-eye field-of-view central area together cover a light emergent surface of the right display panel 40. The right display panel 40 comprises a plurality of right-eye R pixels, a plurality of right-eye G pixels and a plurality of right-eye B pixels.

The left grating layer comprises a left-eye R grating region corresponding to the left-eye R pixels, a left-eye G grating region corresponding to the left-eye G pixels, and a left-eye B grating region corresponding to the left-eye B pixels. The right grating layer comprises a right-eye R grating region corresponding to the right-eye R pixels, a right-eye G grating region corresponding to the right-eye G pixels, and a right-eye B grating region corresponding to the right-eye B pixels.

Along a direction pointing from a center $a_L$ of the left-eye field-of-view central area $A_L$ of the left display panel 30 to the non left-eye field-of-view central area of the left display panel 30, a grating period of the left-eye R grating region, a grating period of the left-eye G grating region, and a grating period of the left-eye B grating region all decrease gradually. Light emitted by the display device 10 from a position corresponding to the left-eye R pixels, light emitted by the display device 10 from a position corresponding to the left-eye G pixels, and light emitted by the display device 10 from a position corresponding to the left-eye B pixels are all directed to the left eye $Z_L$ of the viewer.

Along a direction pointing from a center $a_R$ of the right-eye field-of-view central area $A_R$ of the right display panel 40 to the non right-eye field-of-view central area of the right display panel 40, a grating period of the right-eye R grating region, a grating period of the right-eye G grating region, and a grating period of the right-eye B grating region all decrease gradually. Light emitted by the display device 10 from a position corresponding to the right-eye R pixels, light emitted by the display device 10 from a position corresponding to the right-eye G pixels, and light emitted by the display device 10 from a position corresponding to the right-eye B pixels are all directed to the right eye $Z_R$ of the viewer.

In the above embodiment, the display device 10 comprises the left display panel 30, the right display panel 40, the left grating layer and the right grating layer. Such a display device 10 has the same advantage as the above-described display device 10 comprising the display panel 20 and the grating layer 60, which will not be elaborated any more.

In the above embodiment, the display device 10 comprises the left display panel 30, the right display panel 40, the left grating layer and the right grating layer, wherein the left display panel 30 can be arranged in the same way as the left display area 21 of the display panel 20 in the above-described embodiment, and the right display panel 40 can be arranged in the same way as the right display area 22 of the display panel 20 in the above-described embodiment; the left grating layer can be arranged in the same way as the left grating region 61 of the grating layer 60 in the above-described embodiment, and the right grating layer can be arranged in the same way as the right grating region 62 of the grating layer 60 in the above-described embodiment. When the display device 10 comprises the left display panel 30, the right display panel 40, the left grating layer and the right grating layer, the light barrier 50 can be arranged in the same way as the light barrier 50 in the above-described display device 10 that comprises the display panel 20 and the grating layer 60.

It shall be noted that, although in the above embodiments, the concept of the present disclosure is described by taking the display device 10 with the color scheme of RGB (Red, Green, Blue) as an example, those skilled in the art shall appreciate that the concept of the present disclosure can be applied to display devices with other color schemes, e.g. a color scheme of RGBW (Red, Green, Blue, White).

In descriptions of the above embodiments, specific features, structures, materials or characteristics can be combined in appropriate manners in any one or more embodiments or examples.

The above described are merely specific embodiments of the present disclosure, while they do not intend to limit the protection scope of the present disclosure. Any variation or substitution that is easily conceivable by those skilled in the art within the technical scope disclosed by the present disclosure shall fall into the protection scope of the present disclosure. Thus the protection scope of the present disclosure is defined by the appended claims.

The invention claimed is:

1. A display device, comprising: a display panel, and a grating layer arranged inside or outside of the display panel, wherein the display panel comprises a left display area corresponding to a left eye of a viewer and a right display area corresponding to a right eye of the viewer; the left display area comprises a plurality of left-eye pixels of a first color, a plurality of left-eye pixels of a second color, a plurality of left-eye pixels of a third color, and the right display area comprises a plurality of right-eye pixels of the first color, a plurality of right-eye pixels of the second color, and a plurality of right-eye pixels of the third color;

the grating layer comprises a left grating region corresponding to the left display area, and a right grating region corresponding to the right display area, the left grating region comprises a left-eye grating region of the first color corresponding to the left-eye pixels of the first color, a left-eye grating region of the second color corresponding to the left-eye pixels of the second color, and a left-eye grating region of the third color corresponding to the left-eye pixels of the third color, the right grating region comprises a right-eye grating region of the first color corresponding to the right-eye pixels of the first color, a right-eye grating region of the second color corresponding to the right-eye pixels of the second color, and a right-eye grating region of the third color corresponding to the right-eye pixels of the third color;

along a direction from a center of a left-eye field-of-view central area of the left display area to a non left-eye field-of-view central area of the left display area, a grating period of the left-eye grating region of the first color, a grating period of the left-eye grating region of the second color, and a grating period of the left-eye grating region of the third color all decrease gradually, and light emitted by the display device from a position corresponding to the left-eye pixels of the first color, light emitted by the display device from a position corresponding to the left-eye pixels of the second color, and light emitted by the display device from a position corresponding to the left-eye pixels of the third color are all directed to the left eye of the viewer;

along a direction from a center of a right-eye field-of-view central area of the right display area to a non right-eye field-of-view central area of the right display area, a grating period of the right-eye grating region of the first color, a grating period of the right-eye grating region of the second color, and a grating period of the right-eye grating region of the third color all decrease gradually, and light emitted by the display device from a position corresponding to the right-eye pixels of the first color, light emitted by the display device from a position corresponding to the right-eye pixels of the second color, and light emitted by the display device from a position corresponding to the right-eye pixels of the third color are all directed to the right eye of the viewer; and the left-eye field-of-view central area does not overlap with the right-eye field-of-view central area.

2. The display device according to claim 1, wherein along a direction parallel to a line between the center of the left-eye field-of-view central area and the center of the right-eye field-of-view central area, from the center of the left-eye field-of-view central area to both sides of the left display area, the grating period of the left-eye grating region of the first color, the grating period of the left-eye grating region of the second color, and the grating period of the left-eye grating region of the third color all decrease gradually;

along the direction parallel to the line between the center of the left-eye field-of-view central area and the center of the right-eye field-of-view central area, from the center of the right-eye field-of-view central area to both sides of the right display area, the grating period of the right-eye grating region of the first color, the grating period of the right-eye grating region of the second color, and the grating period of the right-eye grating region of the third color all decrease gradually.

3. The display device according to claim 1, wherein along a direction perpendicular to the line between the center of the left-eye field-of-view central area and the center of the right-eye field-of-view central area, from the center of the left-eye field-of-view central area to both sides of the left display area, the grating period of the left-eye grating region of the first color, the grating period of the left-eye grating region of the second color, and the grating period of the left-eye grating region of the third color all decrease gradually;

along the direction perpendicular to the line between the center of the left-eye field-of-view central area and the center of the right-eye field-of-view central area, from the center of the right-eye field-of-view central area to both sides of the right display area, the grating period of the right-eye grating region of the first color, the grating period of the right-eye grating region of the second color, and the grating period of the right-eye grating region of the third color all decrease gradually.

4. The display device according to claim 1, wherein the plurality of left-eye pixels of the first color, the plurality of left-eye pixels of the second color, the plurality of left-eye pixels of the third color are arranged to form an array of left-eye pixels, rows of pixels of the array of left-eye pixels extend along a direction parallel to a line between the center of the left-eye field-of-view central area and the center of the right-eye field-of-view central area, columns of pixels of the array of left-eye pixels extend along a direction perpendicular to the line between the center of the left-eye field-of-view central area and the center of the right-eye field-of-view central area;

each row of pixels of the array of left-eye pixels includes a plurality of left-eye pixels of the first color, a plurality of left-eye pixels of the second color and a plurality of left-eye pixels of the third color that are arranged alternately;

each column of pixels of the array of left-eye pixels includes one type of the left-eye pixels of the first color, the left-eye pixels of the second color and the left-eye pixels of the third color.

5. The display device according to claim 1, wherein the plurality of left-eye pixels of the first color, the plurality of left-eye pixels of the second color, the plurality of left-eye pixels of the third color are arranged to form an array of left-eye pixels, rows of pixels of the array of left-eye pixels extend along a direction parallel to a line between the center of the left-eye field-of-view central area and the center of the right-eye field-of-view central area, columns of pixels of the array of left-eye pixels extend along a direction perpendicular to the line between the center of the left-eye field-of-view central area and the center of the right-eye field-of-view central area;

each row of pixels of the array of left-eye pixels includes one type of the left-eye pixels of the first color, the left-eye pixels of the second color and the left-eye pixels of the third color;

each column of pixels of the array of left-eye pixels includes a plurality of left-eye pixels of the first color, a plurality of left-eye pixels of the second color and a plurality of left-eye pixels of the third color that are arranged alternately.

6. The display device according to claim 1, wherein the plurality of left-eye pixels of the first color, the plurality of left-eye pixels of the second color, the plurality of left-eye pixels of the third color are arranged to form an array of left-eye pixels, rows of pixels of the array of left-eye pixels extend along a direction parallel to a line between the center of the left-eye field-of-view central area and the center of the right-eye field-of-view central area, columns of pixels of the array of left-eye pixels extend along a direction perpendicular to the line between the center of the left-eye field-of-view central area and the center of the right-eye field-of-view central area;

each row of pixels of the array of left-eye pixels includes a plurality of left-eye pixels of the first color, a plurality of left-eye pixels of the second color and a plurality of left-eye pixels of the third color that are arranged alternately;

each column of pixels of the array of left-eye pixels includes a plurality of left-eye pixels of the first color, a plurality of left-eye pixels of the second color and a plurality of left-eye pixels of the third color that are arranged alternately.

7. The display device according to claim 1, wherein the plurality of right-eye pixels of the first color, the plurality of right-eye pixels of the second color, the plurality of right-eye pixels of the third color are arranged to form an array of right-eye pixels, rows of pixels of the array of right-eye pixels extend along a direction parallel to a line between the center of the left-eye field-of-view central area and the center of the right-eye field-of-view central area, columns of pixels of the array of right-eye pixels extend along a direction perpendicular to the line between the center of the left-eye field-of-view central area and the center of the right-eye field-of-view central area;

each row of pixels of the array of right-eye pixels includes a plurality of right-eye pixels of the first color, a plurality of right-eye pixels of the second color and a plurality of right-eye pixels of the third color that are arranged alternately;

each column of pixels of the array of right-eye pixels includes one type of the right-eye pixels of the first color, the right-eye pixels of the second color and the right-eye pixels of the third color.

8. The display device according to claim 1, wherein the plurality of right-eye pixels of the first color, the plurality of right-eye pixels of the second color, the plurality of right-eye pixels of the third color are arranged to form an array of right-eye pixels, rows of pixels of the array of right-eye pixels extend along a direction parallel to a line between the center of the left-eye field-of-view central area and the center of the right-eye field-of-view central area, columns of pixels of the array of right-eye pixels extend along a direction perpendicular to the line between the center of the left-eye field-of-view central area and the center of the right-eye field-of-view central area;

each row of pixels of the array of right-eye pixels includes one type of the right-eye pixels of the first color, the right-eye pixels of the second color and the right-eye pixels of the third color;

each column of pixels of the array of right-eye pixels includes a plurality of right-eye pixels of the first color, a plurality of right-eye pixels of the second color and a plurality of right-eye pixels of the third color that are arranged alternately.

9. The display device according to claim 1, wherein the plurality of right-eye pixels of the first color, the plurality of right-eye pixels of the second color, the plurality of right-eye pixels of the third color are arranged to form an array of right-eye pixels, rows of pixels of the array of right-eye pixels extend along a direction parallel to a line between the center of the left-eye field-of-view central area and the center of the right-eye field-of-view central area, columns of pixels of the array of right-eye pixels extend along a direction perpendicular to the line between the center of the left-eye field-of-view central area and the center of the right-eye field-of-view central area;

each row of pixels of the array of right-eye pixels includes a plurality of right-eye pixels of the first color, a plurality of right-eye pixels of the second color and a plurality of right-eye pixels of the third color that are arranged alternately;

each column of pixels of the array of right-eye pixels includes a plurality of right-eye pixels of the first color, a plurality of right-eye pixels of the second color and a plurality of right-eye pixels of the third color that are arranged alternately.

10. The display device according to claim 1, wherein the left grating region comprises a plurality of left grating bulges, which are bar-shaped left grating bulges, each left grating bulges extends along a direction perpendicular to a line between the center of the left-eye field-of-view central area and the center of the right-eye field-of-view central area, and the plurality of left grating bulges are arranged in parallel along a direction parallel to the line between the center of the left-eye field-of-view central area and the center of the right-eye field-of-view central area.

11. The display device according to claim 1, wherein the left grating region comprises a plurality of left grating bulges, which are bar-shaped left grating bulges, each left grating bulges extends along a direction parallel to a line between the center of the left-eye field-of-view central area and the center of the right-eye field-of-view central area, and the plurality of left grating bulges are arranged in parallel along a direction perpendicular to the line between the center of the left-eye field-of-view central area and the center of the right-eye field-of-view central area.

12. The display device according to claim 1, wherein the right grating region comprises a plurality of right grating bulges, which are bar-shaped right grating bulges, each right grating bulges extends along a direction perpendicular to a line between the center of the left-eye field-of-view central area and the center of the right-eye field-of-view central area, and the plurality of right grating bulges are arranged in parallel along a direction parallel to the line between the center of the left-eye field-of-view central area and the center of the right-eye field-of-view central area.

13. The display device according to claim 1, wherein the right grating region comprises a plurality of right grating bulges, which are bar-shaped right grating bulges, each right grating bulge extends along a direction parallel to a line between the center of the left-eye field-of-view central area and the center of the right-eye field-of-view central area, and the plurality of right grating bulges are arranged in parallel along a direction perpendicular to the line between the center of the left-eye field-of-view central area and the center of the right-eye field-of-view central area.

14. The display device according to claim 1, wherein the viewer views an image displayed on the display device, the image is projected on a virtual screen behind the display device, the virtual screen is a curved-surface virtual screen, the virtual screen has a center of a circle, and a midpoint of a line between the left eye and right eye of the viewer is at the center of circle of the virtual screen.

15. The display device according to claim 1, wherein the viewer views an image displayed on the display device, the image is projected on a virtual screen behind the display device, the virtual screen is a curved-surface virtual screen, the virtual screen has a center of circle, and the viewer is at a side of the center of circle of the virtual screen close to the virtual screen.

16. The display device according to claim 1, wherein the viewer views an image displayed on the display device, the image is projected on a virtual screen behind the display device, the virtual screen is a curved-surface virtual screen and has a center of circle, the display device is at a side of the center of circle of the virtual screen close to the virtual screen, and the viewer is at a side of the center of circle of the virtual screen far away from the virtual screen.

17. The display device according to claim 1, wherein the left grating region comprises a plurality of left grating bulges, wherein a left grating bulge corresponding to the left-eye field-of-view central area has a thickness $h_{AL}$ that satisfies the formula of:

$$h_{AL} = \frac{m_{AL}\lambda}{|n_{GAL} - n_{SAL}|}$$

wherein, $n_{GAL}$ is a refractive index of the left grating bulge corresponding to the left-eye field-of-view central area, $n_{SAL}$ is a refractive index of a filler in a gap between two adjacent left grating bulges corresponding to the left-eye field-of-view central area, $\lambda$ is a wavelength of incident light incident on the grating layer, $m_{AL}$ is a first constant, which satisfies: $i_{AL}-\frac{1}{2}<m_{AL}\leq i_{AL}+\frac{1}{2}$, $i_{AL}=1, 2, 3, 4K$;

a left grating bulge corresponding to the non left-eye field-of-view central area has a thickness $h_{BL}$ that satisfies the formula of:

$$h_{BL} = \frac{m_{BL}\lambda}{|n_{GBL} - n_{SBL}|}$$

wherein, $n_{GBL}$ is a refractive index of the left grating bulge corresponding to the non left-eye field-of-view central area, $n_{SBL}$ is a refractive index of a filler in a gap between two adjacent left grating bulges corresponding to the non left-eye field-of-view central area, $\lambda$ is a wavelength of incident light incident on the grating layer, $m_{BL}$ is a second constant, which satisfies: $m_{BL}=i_{BL}+\frac{1}{2}$, $i_{BL}=0, 1, 2, 3, 4K$;

the right grating region comprises a plurality of right grating bulges, and a right grating bulge corresponding to the right-eye field-of-view central area has a thickness $h_{AR}$ that satisfies the formula of:

$$h_{AR} = \frac{m_{AR}\lambda}{|n_{GAR} - n_{SAR}|}$$

wherein, $n_{GAR}$ is a refractive index of the right grating bulge corresponding to the right-eye field-of-view central area, $n_{SAR}$ is a refractive index of a filler in a gap between two adjacent right grating bulges corresponding to the right-eye field-of-view central area, $\lambda$ is a wavelength of incident light incident on the grating layer, $m_{AR}$ is a third constant, which satisfies: $i_{AR} - \frac{1}{2} < m_{AR} < i_{AR} + \frac{1}{2}$, $i_{AR} = 1, 2, 3, 4K$;
a right grating bulge corresponding to the non right-eye field-of-view central area has a thickness $h_{BR}$ that satisfies the formula of:

$$h_{BR} = \frac{m_{BR}\lambda}{|n_{GBR} - n_{SBR}|}$$

wherein, $n_{GBR}$ is a refractive index of the right grating bulge corresponding to the non right-eye field-of-view central area, $n_{SBR}$ is a refractive index of a filler in a gap between two adjacent right grating bulges corresponding to the non right-eye field-of-view central area, $\lambda$ is a wavelength of incident light incident on the grating layer, $m_{BR}$ is a fourth constant, which satisfies: $m_{BR} = i_{BR} + \frac{1}{2}$, $i_{BR} = 0, 1, 2, 3, 4K$.

18. The display device according to claim 17, wherein the left-eye grating region of the first color is a left-eye R grating region, the left-eye grating region of the second color is a left-eye G grating region, the left-eye grating region of the third color is a left-eye B grating region, the right-eye grating region of the first color is a right-eye R grating region, the right-eye grating region of the second color is a right-eye G grating region, and the right-eye grating region of the third color is a right-eye B grating region, in an area corresponding to the left-eye field-of-view central area, the thickness $h_{ARL}$ of the left grating bulge of the left-eye R grating region satisfies: 315 nm < $h_{ARL}$ < 945 nm, the thickness $h_{AGL}$ of the left grating bulge of the left-eye G grating region satisfies: 275 nm < $h_{AGL}$ < 825 nm, the thickness $h_{ABL}$ of the left grating bulge of the left-eye B grating region satisfies: 215 nm < $h_{ABL}$ < 645 nm;

in an area corresponding to the non left-eye field-of-view central area, the thickness $h_{BRL}$ of the left grating bulge of the left-eye R grating region is 630 nm, the thickness $h_{BGL}$ of the left grating bulge of the left-eye G grating region is 550 nm, the thickness $h_{BBL}$ of the left grating bulge of the left-eye B grating region is 430 nm;

in an area corresponding to the right-eye field-of-view central area, the thickness $h_{ARR}$ of the right grating bulge of the right-eye R grating region satisfies: 315 nm < $h_{ARR}$ < 945 nm, the thickness $h_{AGR}$ of the right grating bulge of the right-eye G grating region satisfies: 275 nm < $h_{AGR}$ < 825 nm, the thickness $h_{ABR}$ of the right grating bulge in the right-eye B grating region satisfies: 215 nm < $h_{ABR}$ < 645 nm;

in an area corresponding to the non right-eye field-of-view central area, the thickness $h_{BRR}$ of the right grating bulge of the right-eye R grating region is 630 nm, the thickness $h_{BGR}$ of the right grating bulge of the right-eye G grating region is 550 nm, the thickness $h_{BBR}$ of the right grating bulge of the right-eye B grating region is 430 nm.

19. The display device according to claim 1, wherein
in an area corresponding to the left-eye field-of-view central area, a grating duty cycle $dc_{AL}$ of the left grating region satisfies $0.2 \leq dc_{AL} \leq 0.8$;
in an area corresponding to the non left-eye field-of-view central area, the grating duty cycle $dc_{BL}$ of the left grating region is 0.5;
in an area corresponding to the right-eye field-of-view central area, a grating duty cycle $dc_{AR}$ of the right grating region satisfies $0.2 \leq dc_{AR} \leq 0.8$;
in an area corresponding to the non right-eye field-of-view central area, the grating duty cycle $dc_{BR}$ of the right grating region is 0.5.

20. A display device, comprising a left display panel, a right display panel, a left grating layer arranged inside or outside of the left display panel, and a right grating layer arranged inside or outside of the right display panel, wherein
the left display panel corresponds to a left eye of a viewer, the right display panel corresponds to a right eye of the viewer, the left display panel comprises a plurality of left-eye pixels of a first color, a plurality of left-eye pixels of a second color, a plurality of left-eye pixels of a third color, and the right display panel comprises a plurality of right-eye pixels of the first color, a plurality of right-eye pixels of the second color, and a plurality of right-eye pixels of the third color;
the left grating layer comprises a left-eye grating region of the first color corresponding to the left-eye pixels of the first color, a left-eye grating region of the second color corresponding to the left-eye pixels of the second color, and a left-eye grating region of the third color corresponding to the left-eye pixels of the third color;
the right grating layer comprises a right-eye grating region of the first color corresponding to the right-eye pixels of the first color, a right-eye grating region of the second color corresponding to the right-eye pixels of the second color, and a right-eye grating region of the third color corresponding to the right-eye pixels of the third color;
along a direction from a center of a left-eye field-of-view central area of the left display panel to a non left-eye field-of-view central area of the left display panel, a grating period of the left-eye grating region of the first color, a grating period of the left-eye grating region of the second color, and a grating period of the left-eye grating region of the third color all decrease gradually, and light emitted by the display device from a position corresponding to the left-eye pixels of the first color, light emitted by the display device from a position corresponding to the left-eye pixels of the second color, and light emitted by the display device from a position corresponding to the left-eye pixels of the third color are all directed to the left eye of the viewer;
along a direction from a center of a right-eye field-of-view central area of the right display panel to a non right-eye field-of-view central area of the right display panel, a grating period of the right-eye grating region of the first color, a grating period of the right-eye grating region of the second color, and a grating period of the right-eye grating region of the third color all decrease gradually, and light emitted by the display device from a position corresponding to the right-eye pixels of the first color, light emitted by the display device from a position corresponding to the right-eye pixels of the second color, and light emitted by the display device from a position corresponding to the right-eye pixels of the third color are all directed to the right eye of the viewer; and the left-eye field-of-view central area does not overlap with the right-eye field-of-view central area.

* * * * *